United States Patent
Chasman et al.

(10) Patent No.: US 8,596,040 B2
(45) Date of Patent: Dec. 3, 2013

(54) ROCKET MULTI-NOZZLE GRID ASSEMBLY AND METHODS FOR MAINTAINING PRESSURE AND THRUST PROFILES WITH THE SAME

(75) Inventors: Daniel Chasman, Tucson, AZ (US); Stephen D. Haight, Oro Valley, AZ (US); Daniel V. MacInnis, Vail, AZ (US)

(73) Assignee: Raytheon Company, Waltham, MA (US)

( * ) Notice: Subject to any disclaimer, the term of this patent is extended or adjusted under 35 U.S.C. 154(b) by 301 days.

(21) Appl. No.: 13/049,024

(22) Filed: Mar. 16, 2011

(65) Prior Publication Data

US 2012/0233979 A1    Sep. 20, 2012

(51) Int. Cl.
F02K 3/10    (2006.01)

(52) U.S. Cl.
USPC ............................................. 60/263

(58) Field of Classification Search
USPC .......... 60/224, 263, 770; 239/265.11, 265.19, 239/265.25
See application file for complete search history.

(56) References Cited

U.S. PATENT DOCUMENTS

| | | | |
|---|---|---|---|
| 2,760,371 A | | 8/1956 | Borden |
| 2,933,889 A | * | 4/1960 | Tolkmitt .................. 239/265.27 |
| 2,967,393 A | | 1/1961 | Von Braun |
| 2,972,225 A | * | 2/1961 | Cumming et al. ............. 60/250 |
| 3,038,305 A | | 6/1962 | Price |
| 3,048,970 A | * | 8/1962 | Herzog .................... 239/265.11 |
| 3,052,090 A | * | 9/1962 | Herzog .................... 239/265.11 |
| 3,097,482 A | * | 7/1963 | Lovingham ..................... 60/258 |
| 3,115,747 A | | 12/1963 | Yu |
| 3,488,951 A | * | 1/1970 | Bogue et al. .................... 60/258 |
| 3,630,412 A | * | 12/1971 | Capener et al. ................... 222/1 |
| 5,112,007 A | * | 5/1992 | Buchele-Buecher ........ 244/3.22 |
| 5,343,698 A | * | 9/1994 | Porter et al. .................... 60/770 |
| 5,899,388 A | * | 5/1999 | Sion et al. ..................... 239/424 |
| 6,370,867 B1 | * | 4/2002 | Schnoor .......................... 60/258 |
| 7,108,233 B2 | | 9/2006 | Giuseppin |
| 7,287,725 B2 | | 10/2007 | Chasman et al. |
| 8,117,847 B2 | | 2/2012 | Haight et al. |
| 2005/0000218 A1 | * | 1/2005 | Canfield et al. ................. 60/770 |

FOREIGN PATENT DOCUMENTS

| | | |
|---|---|---|
| FR | 1066499 A | 6/1954 |
| GB | 792831 A | 4/1958 |

* cited by examiner

*Primary Examiner* — Phutthiwat Wongwian
(74) *Attorney, Agent, or Firm* — Schwegman, Lundberg & Woessner, P.A.

(57) ABSTRACT

A rocket multi-nozzle grid assembly includes an insulator grid, a plurality of refractory nozzle fittings and a grid support plate. The grid support plate braces the plurality of refractory nozzle fittings and the insulator grid. The insulator grid includes insulator orifices, each of the nozzle fittings includes a fitting orifice and the grid support plate includes a plurality of plate orifices. The rocket multi-nozzle grid assembly includes a plurality nozzles. Each nozzle includes a plate orifice aligned with one insulator orifice and one fitting orifice. Exhaust gases are directed through the plurality of nozzles. The multi-nozzle grid assembly substantially maintains its surface area throughout operation of a rocket motor.

21 Claims, 11 Drawing Sheets

ROCKET MULTI-NOZZLE GRID ASSEMBLY AND METHODS FOR MAINTAINING PRESSURE AND THRUST PROFILES WITH THE SAME

TECHNICAL FIELD

Embodiments pertain to multi-nozzle grid assemblies used in rocket and missiles and the maintenance of pressure and thrust within combustion chambers with multi-nozzle grid assemblies.

BACKGROUND

Missiles and rockets use combust propellants within combustion chambers and rely on thrust generated through a nozzle to propel the body of the missile or rocket. In some examples, rocket motors use nozzles with contoured surfaces on one or more of the nozzle inlet or outlet to funnel exhaust gases from the combustion chamber and achieve supersonic exhaust flow with corresponding high thrust. The supersonic exhaust flow is generated with pressurized but subsonic exhaust gases generated from combusting propellant within the combustion chamber. The use of long contoured nozzles provides an efficient system for generating supersonic exhaust flow from these otherwise high pressure but subsonic exhaust gases in the combustion chamber. Long contoured nozzles however require large amounts of space within the volume of a rocket. The long contoured nozzles are correspondingly heavy and thereby reduce the performance of rockets because of their weight and large volume.

In other examples, rocket motors include multiple nozzles in grids that use thermally resistive refractory materials. The multiple nozzle grids provide a series of nozzles in a compact short configuration. Refractory materials such as Tungsten are not structurally robust and lack the integrity to withstand the high pressure generated within a combustion chamber. Alternatively, the multiple nozzle grids including Tungsten are constructed with enhanced thickness to withstand the high pressures within the combustion chamber. The added refractory material makes the grids heavy (with corresponding increases to the overall weight of the rocket) and reduces the performance of the rocket motor.

In another example, brittle refractory materials are sometimes used in single nozzle rocket motors. However, brittle refractory materials lack the structural integrity needed in a grid to withstand impinging high pressure exhaust gases. Instead, the brittle refractory materials fail allowing uncontrolled release of exhaust gases. The desired thrust and pressure profiles for the rocket motor cannot thereby be maintained.

SUMMARY

In accordance with some embodiments, a rocket multi-nozzle grid assembly is discussed that provides a plurality of nozzles including refractory nozzle fittings configured to withstand high temperatures and accelerate the exhaust gases to supersonic velocity. The nozzle fittings are provided within a grid support plate having sufficient structural integrity to support the nozzle fittings and withstand the high pressures generated within a combustion chamber. Further, the grid assembly includes an insulator grid coupled over the plurality of nozzle fittings and the grid support plate to insulate the grid support plate from the high temperatures within the combustion chamber (in cooperation with the refractory nozzle fittings).

The components of the rocket multi-nozzle grid including the insulator grid, the refractory nozzle fittings and the grid support plate provide a plurality of nozzles with convergent inlets and divergent outlets comprising portions of each of the components. The supersonic flow of exhaust gases with a corresponding thrust profile is provided through the convergent and divergent tapered contour of the plurality of nozzles. The supersonic flow and thrust are provided through a multi-nozzle grid assembly having substantially minimized length and weight compared to an equivalent single nozzle. Further, by using a plurality of nozzles within a grid the propellant is screened throughout operation of a rocket motor, and the grid retains substantially all of propellant (including uncombusted and loose propellant) therein. Screening and retention of the propellant maximizes combustion, the corresponding pressure within the combustion chamber and the thrust generated through the multi-nozzle grid assembly. The maximized consumption of propellant offsets the performance losses between an equivalent single nozzle and the multiple nozzles used in the grid assembly.

Further, the rocket multi-nozzle grid assembly maintains the combustion chamber pressure and corresponding thrust within desired performance profiles. The ablative insulator grid substantially maintains the surface area of the grid with only minimal erosion around the nozzles during operation of a rocket motor. In effect, the grid loses thickness, but not surface area. The ablated insulator grid fragments sacrificially protect the nozzle fittings and the grid support plate. The multi-nozzle grid assembly thereby maintains nearly the same shape throughout operation of the rocket motor. Correspondingly, specified pressure and thrust profiles are maintained throughout combustion of the propellant by throttling exhaust gases through substantially the same nozzle diameter and contour.

Further still, the ablated insulator grid cools the other components of the grid including the refractory nozzles and the grid support plate. The ablated fragments physically remove heat from the multi-nozzle grid assembly by separating from the assembly. Moreover, the ablated fragments cool the nozzle fittings and the grid support plate by absorbing latent heat from the exhaust gases through phase changes (e.g., from solid to liquid and liquid to gas states). The heat absorbed by the ablated fragments is removed from the nozzle fittings and the grid support plate and ensures the plate and fittings substantially maintain their tapered contour and diameter. Moreover, the tapered configuration of the insulator grid orifices (and the nozzle fitting orifices) is configured to direct the ablated fragments entrained within exhaust gases into the nozzles and ensures the ablated fragments cool the nozzle fittings and the grid support plate.

BRIEF DESCRIPTION OF THE DRAWINGS

A more complete understanding of the present subject matter may be derived by referring to the detailed description and claims when considered in connection with the following illustrative Figures. In the following Figures, like reference numbers refer to similar elements and steps throughout the Figures.

Elements and steps in the Figures are illustrated for simplicity and clarity and have not necessarily been rendered according to any particular sequence. For example, steps that may be performed concurrently or in different order are illustrated in the Figures to help to improve understanding of examples of the present subject matter.

DESCRIPTION OF THE DRAWINGS

In the following detailed description, reference is made to the accompanying drawings which form a part hereof, and in which is shown by way of illustration specific examples in which the subject matter may be practiced. These examples are described in sufficient detail to enable those skilled in the art to practice the subject matter, and it is to be understood that other examples may be utilized and that structural changes may be made without departing from the scope of the present subject matter. Therefore, the following detailed description is not to be taken in a limiting sense, and the scope of the present subject matter is defined by the appended claims and their equivalents.

The present subject matter may be described in terms of functional block components and various processing steps. Such functional blocks may be realized by any number of techniques, technologies, and methods configured to perform the specified functions and achieve the various results. For example, the present subject matter may employ various materials, actuators, electronics, shape, airflow surfaces, reinforcing structures, explosives and the like, which may carry out a variety of functions. In addition, the present subject matter may be practiced in conjunction with any number of devices, and the systems described are merely exemplary applications.

Figure 1A:
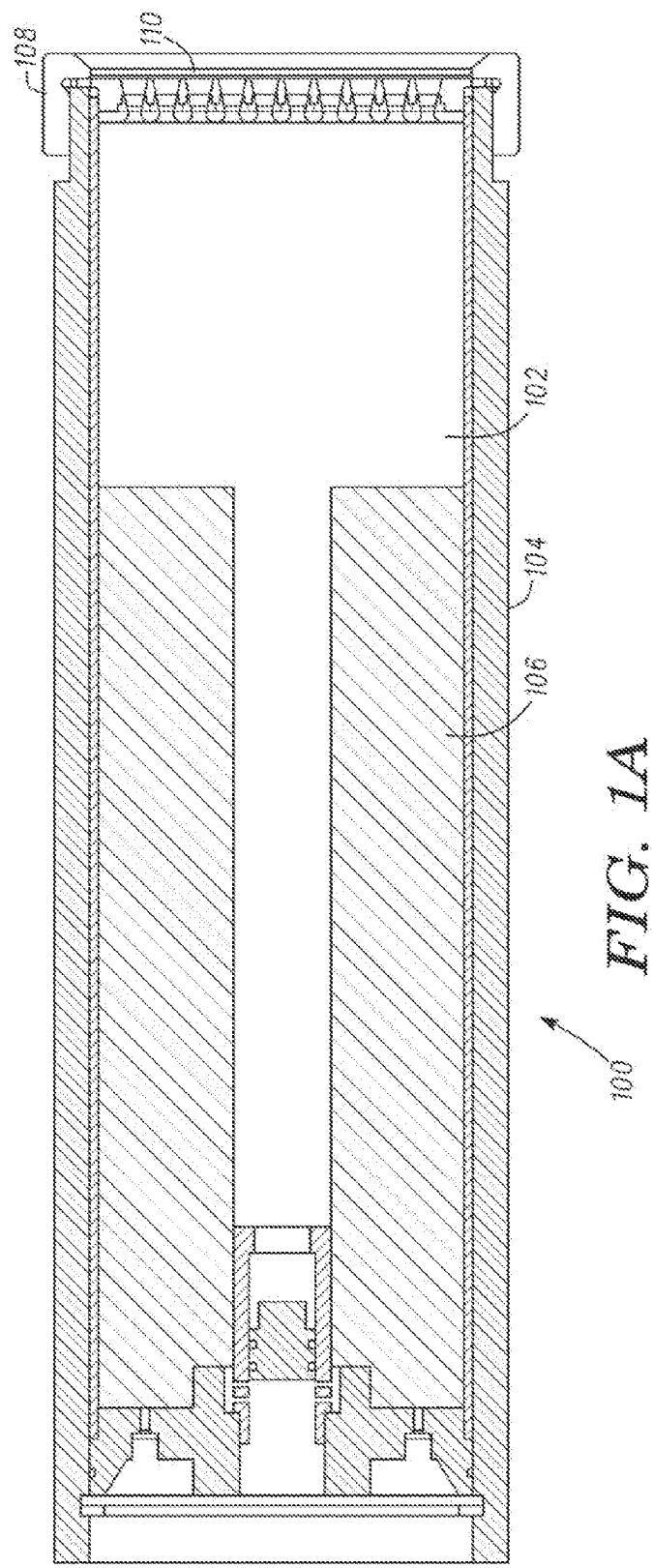
FIG. 1A is a cross sectional view of a rocket motor including a rocket multi-nozzle grid assembly in accordance with some embodiments.

FIG. 1A shows one example of a rocket motor 100 configured for use with a multi-nozzle grid assembly, such as the grid assembly 110 shown herein in accordance with some embodiments. The rocket motor 100 includes a motor housing 104 containing a combustion chamber 102. As shown in FIG. 1A, the combustion chamber 102 includes a propellant 106 disposed within the chamber. In one example, the motor housing 104 is configured to retain a solid propellant. In another example, the combustion chamber 112 is configured to contain a liquid propellant. In still another example, the combustion chamber 102 is configured to retain a hybrid propellant including liquid and solid components. At one end of the rocket motor 100 the multi-nozzle grid assembly 110 is coupled with the motor housing 104. A retaining ring 108 is positioned around the multi-nozzle grid assembly 110 and holds the multi-nozzle grid assembly 110 in engagement with the motor housing 104 of the rocket motor 100. In one example, the rocket motor components such as the motor housing 104 and the retaining ring 108 are constructed with structurally robust materials including, but not limited to, steel, titanium, composites and other materials sized and shaped to retain exhaust gases within the combustion chamber 102 during combustion of the propellant 106.

Figure 1B:
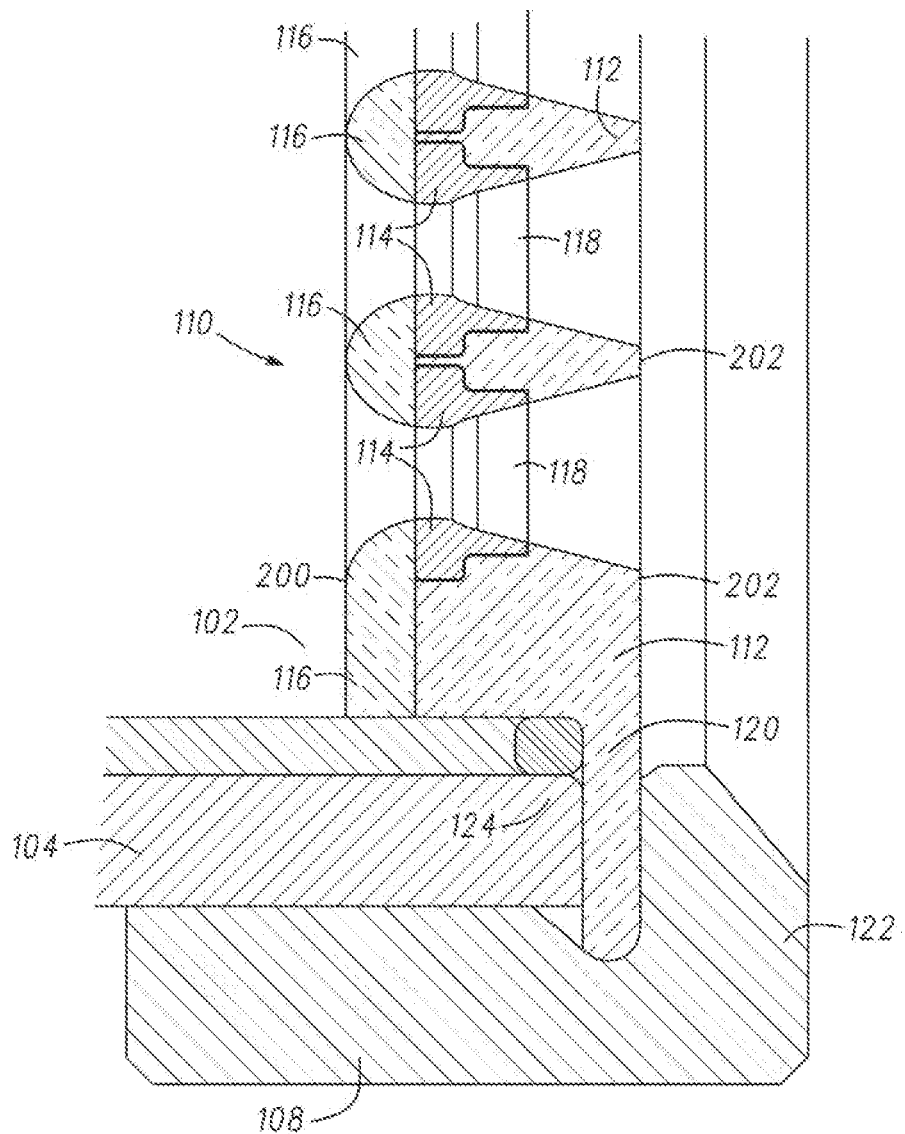
FIG. 1B is a detailed cross sectional view of the rocket motor shown in FIG. 1A in accordance with some embodiments.

Referring now to FIG. 1B, a portion of the rocket motor 100 is shown in cross section including the retaining ring 108, the motor housing 104 and a portion of the multi-nozzle grid assembly 110. As shown in FIG. 1B, the multi-nozzle grid assembly 110 is coupled with the motor housing 104 with the retaining ring 108. For instance, the multi-nozzle grid assembly 110 includes an installation flange 120 and the installation flange 120 is positioned between a ring lip 122 of the retaining ring 108 and a housing end 124 of the motor housing 104. In one example, fastening features (e.g., threading, bolts, screws, welds and the like) are provided between the retaining ring 108 and the motor housing 104 to engage the retaining ring 108 with the motor housing 104 and sandwich the installation flange 120 therebetween. The installation flange 120 and the multi-nozzle grid assembly 110 are thereby clamped between the retaining ring 108 and the motor housing 104 to immobilize the multi-nozzle grid assembly 110 relative to the rocket motor 100.

Referring again to FIG. 1B, the multi-nozzle grid assembly 110 is shown in detail. For instance, the multi-nozzle grid assembly 110 is a composite assembly of two or more components including an insulator grid 116, a plurality of nozzle fittings 114 and a grid support plate 112. As will be described in further detail herein, each of the components of the multi-nozzle grid assembly 110 are positioned and constructed to maximize the performance of a plurality of nozzles 118 extending through the multi-nozzle grid 110 and ensure the surface area of the multi-nozzle grid 110 remains substantially the same throughout operation of the rocket motor 100

(e.g., from the ignition of the propellant through full combustion of the propellant). For instance, as shown in FIG. 1B, the grid support plate 112 underlies the nozzle fittings 114 and the insulator grid 116. The grid support plate 112 provides robust structural support (e.g., bracing) for the nozzle fittings 114 and the insulator grid 116. The plurality of nozzle fittings 114 are seated within the grid support plate 112. In one example, the nozzle fittings 114 are constructed with thermally resistant refractory materials. The nozzle fittings 114 are resistant to the high temperatures generated by exhaust gases in the rocket motor 100. The nozzle fittings 114 thereby substantially protect the underlying grid support plate 112 and ensure the contoured configuration of the plurality of nozzles 118 is maintained throughout combustion of the propellant and delivery of exhaust gases through the plurality of nozzles 118. The insulator grid 116 positioned over the nozzle fittings 114 and the grid support plate 112 insulates the fittings 114 and the grid support plate 112 from the high pressure and high temperature exhaust gases directed through the nozzles 118 and generated within the combustion chamber 102.

In one example, the insulator grid 116 is an ablative insulator grid and is configured to gradually erode in a controlled and specified manner when exposed to the high temperatures and high pressures of the exhaust gases within the combustion chamber 102. The insulator grid 116 in effect sacrificially ablates (e.g., partially fragments) with the ablated fragments becoming entrained within exhaust gases and passing through the nozzles 118. While the multi-nozzle grid assembly 110 decreases in thickness during operation of the rocket motor 100 through ablation of the grid 116 the surface area of the multi-nozzle grid assembly 110 remains substantially the same (as does the contoured shape of the plurality of nozzles 118) throughout operation of the rocket motor 100. As will be described in further detail below, maintenance of the surface area of the multi-nozzle grid 110 including, for instance, the contoured shape of the plurality of nozzles 118 ensures the rocket motor 100 is capable of generating thrust following a specified and predicted thrust profile.

Figure 2:
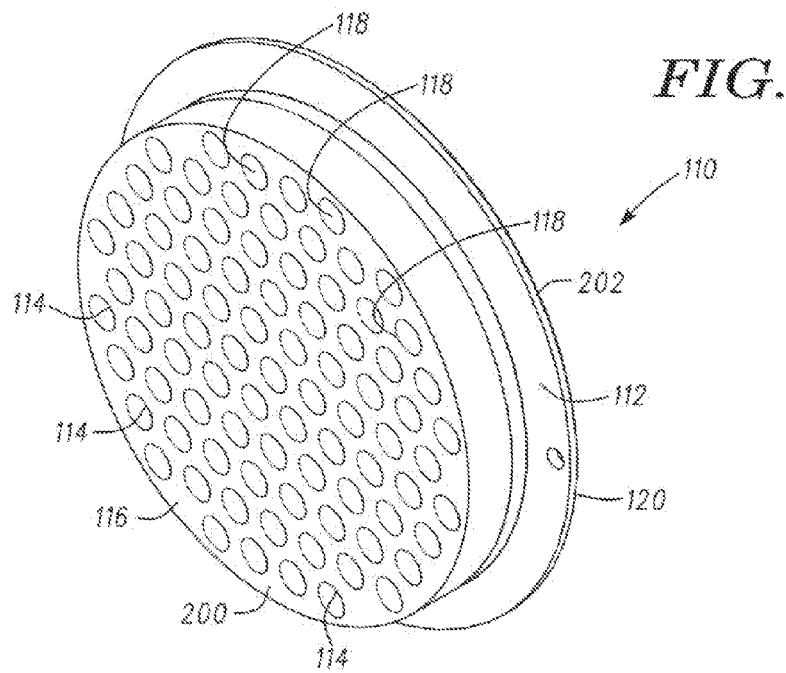
FIG. 2 is a perspective view of the rocket multi-nozzle grid assembly shown in FIG. 1A in accordance with some embodiments.

FIG. 2 shows the multi-nozzle grid assembly 110 in an assembled configuration with the grid support plate 112 underlying the insulator grid 116. The plurality of nozzle fittings 114 are interposed between the grid support plate 112 and the insulator grid 116. As shown in FIG. 1B, the insulator grid 116, the plurality of nozzle fittings 114 and the grid support plate 112 cooperate to form a plurality of nozzles 118 extending through the multi-nozzle grid assembly 110, for instance, between an assembly combustion face 200 and an assembly exhaust face 202 opposed to the combustion face 200. When installed, the assembly combustion face 200 is positioned on the interior of the combustion chamber 102 shown in FIGS. 1A and 1B. Conversely, the assembly exhaust face 202 is positioned on the exterior portion of the rocket motor 100. As will be described in further detail below, the multi-nozzle grid assembly 110 including the assembly combustion face 200 has a substantially static surface area. The multi-nozzle grid assembly 110 is thereby configured to maintain a specified pressure profile within the combustion chamber 102 (through maintenance of the grid surface area). By maintaining the pressure profile within the combustion chamber 102 a corresponding thrust profile is generated and maintained through delivery of exhaust gases through the plurality of nozzles 118. The multi-nozzle grid assembly 110 thereby cooperates with the remainder of the rocket motor 100 to ensure the propellant, such as propellant 106 shown in FIG. 1A, is combusted in a predictable manner according to a specified pressure profile to thereby generate a predictable thrust profile. The multi-nozzle grid assembly 110 enhances the performance of the rocket motor 100 relative to previous multi-nozzle designs and in some cases single nozzle designs.

Figure 3:
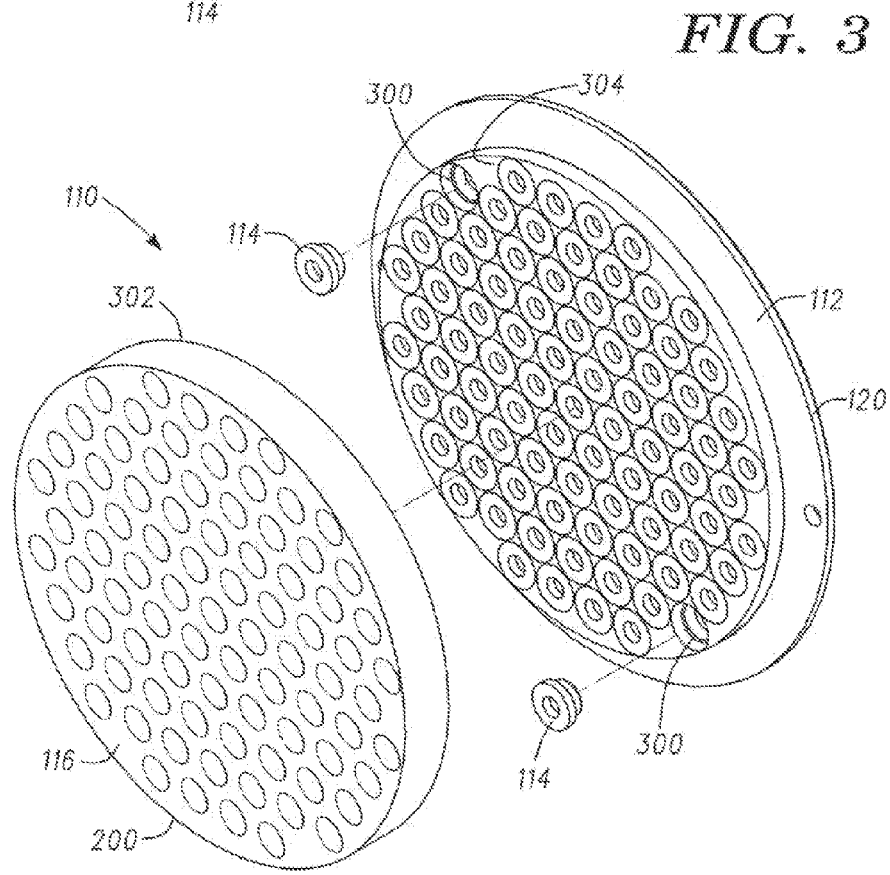
FIG. 3 is an exploded view of the rocket multi-nozzle grid assembly shown in FIG. 1A in accordance with some embodiments.

Referring now to FIG. 3, the multi-nozzle grid assembly 110 is shown in a partially exploded view with the insulator grid 116 spaced from the grid support plate 112. As shown the grid support plate 112 includes a plurality of fitting cavities 300 sized and shaped to receive the plurality of nozzle fittings 114 therein. Two of the nozzle fittings 114 are shown exploded away from the grid support plate 112 to expose the fitting cavities 300. In one example, the remainder of the nozzle fittings 114 are received within identical cavities 300 within the remainder of the grid support plate 112. As previously described, the multi-nozzle grid assembly 110 is a composite assembly of the insulator grid 116, the nozzle fittings 114 and the grid support plate 112. In one example, the insulator grid 116 includes an insulator coupling face 302 opposed to the assembly combustion face 200. The insulator coupling face 302 is configured for coupling with a plate coupling face 304 of the grid support plate 112. In one example, the insulator grid 116 is coupled with the grid support plate 112 with an adhesive. In another example, the adhesive used to couple the insulator grid 116 with the grid support plate 112 includes a hysol adhesive, an epoxy adhesive and the like. In yet another example, the insulator grid 116 is coupled with the grid support plate 112 with one or more coupling features including, but not limited to, adhesives, welds, mechanical fasteners, mechanical fittings and the like.

As shown in FIG. 3, the plurality of nozzle fittings 114 are seated within fitting cavities 300. In one example, the nozzle fittings 114 are seated within the fitting cavities 300 and thereafter retained in place by engagement between the grid support plate 112 and the insulator grid 116. Optionally, a bonding agent is applied to one or more of the fitting cavities 300 or the nozzle fittings 114. In one example, the bonding agent includes a high temperature silicone adhesive. The silicone adhesive assists in retaining the plurality of nozzle fittings 114 within the fitting cavities 300. The bonding agent cooperates with the mechanical engagement (e.g., seating) of the nozzle fittings 114 within the fitting cavities 300 as well as the interposing engagement of the fittings 114 between the insulator grid 116 and the grid support plate 112.

Figure 4A:
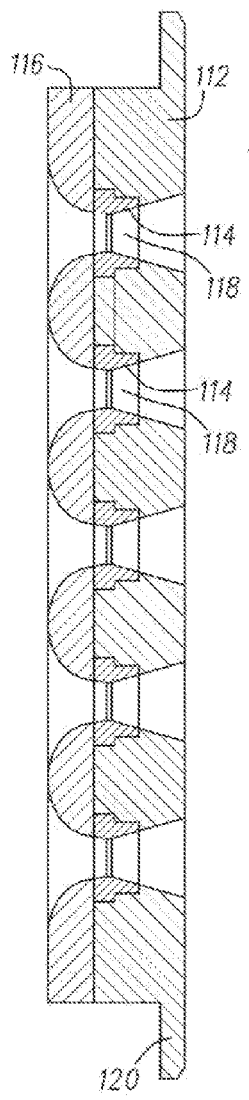
FIG. 4A is a cross sectional view of the rocket multi-nozzle grid assembly shown in FIG. 2 in accordance with some embodiments.
Figure 4B:
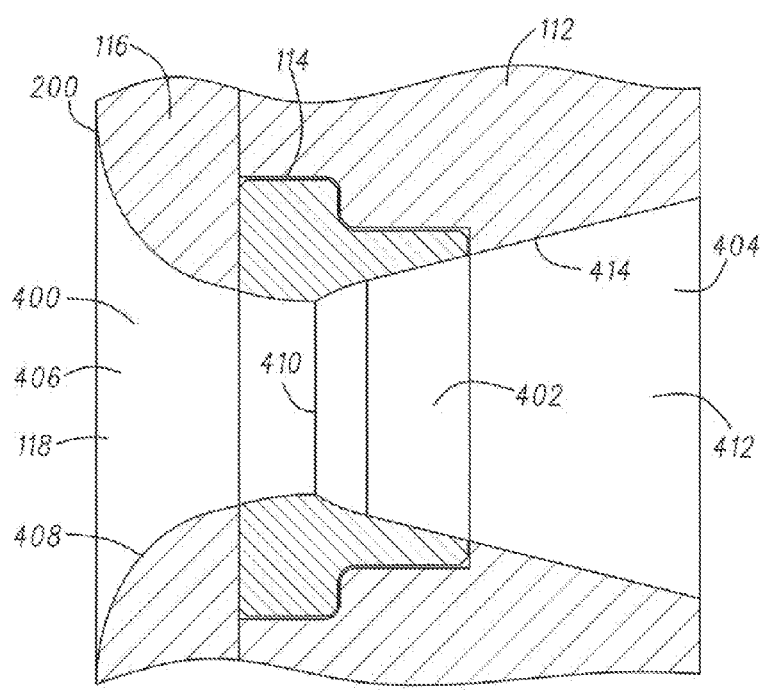
FIG. 4B is a detailed cross sectional view of the rocket multi-nozzle grid assembly shown in FIG. 2 in accordance with some embodiments.

Referring now to FIGS. 4A and 4B, the multi-nozzle grid assembly 110 is shown in cross-section. The components of the multi-nozzle grid assembly 110 are shown in an assembled configuration with the plurality of nozzle fittings 114 seated within the grid support plate 112. The insulator grid 116 is coupled over top of the plurality of nozzle fittings 114 as well as the grid support plate 112. As shown in FIG. 4A, a plurality of nozzles 118 extend through each of the insulator grid 116 the plurality of nozzle fittings 114 and the grid support plate 112. As previously described and shown in FIG. 3A, in one example, the nozzle fittings 114 are seated within the fitting cavities 300 and thereafter bonded in place with a bonding agent, such as a high temperature silicone adhesive. In another example, the insulator grid 116 is adhered to one or more of the plurality of nozzle fittings 114 or the grid support plate 112 with an adhesive including, but not limited to, a hysol adhesive, an epoxy adhesive and the like.

Referring now to FIG. 4B, one of the nozzles 118 extending through the multi-nozzle grid assembly 110 is shown. In this detailed cross-sectional view the multi-nozzle grid assembly 110 is shown with the insulator grid 116 and the nozzle fitting 114 assembled and coupled with the grid support plate 112. The grid support plate 112 provides a structural matrix that supports and braces the insulator grid 116 and the plurality of nozzle fittings 114. The grid support plate 112 includes, but is not limited to, robust structural materials having tensile strength (e.g., from approximately 120 to 300 ksi) greater than the tensile strengths of the plurality of nozzle fittings 114 and the grid support plate 116. As described above, the grid support plate 112 braces each of the plurality and nozzle fittings 114 as well as the insulator grid 116 during the operation of the rocket motor 100. That is to say, the grid support plate 112 provides a structural brace to each of these components and substantially prevents their mechanical failure, for instance, through impinging exhaust gases delivered along the plurality of nozzle fittings 114 and the insulator grid 116 during combustion of propellant within the rocket motor 100. In one example, the grid support plate 112 does not have the thermal resistance of the plurality of nozzle fittings 114. The grid support plate is constructed with materials having high tensile strengths capable of bracing the other components of the multi-nozzle grid assembly 110. For instance, the grid support plate includes, but is not limited to, P20 tool steel, maraging steel, heat treated steels and the like. In contrast, the plurality of nozzle fittings 114 are provided because of their high thermal resistance. The plurality of nozzle fittings 114 insulate the grid support plate 112 from high temperature exhaust gases moving through the nozzle 118.

In one example, the nozzle fittings 114 are constructed with but not limited to refractory materials that are highly heat resistant and thereby ensure the contour (e.g., shape and size) of the nozzle 118 is maintained throughout operation of the rocket motor, such as the rocket motor 100 shown in FIG. 1A. The plurality of nozzle fittings 114 ensure the shape and diameter of the nozzles 118 remain substantially the same throughout combustion of the propellant within the combustion chamber 102. By maintaining the diameter and shape of the nozzles 118 the surface area, for instance the surface area of multi-nozzle grid assembly 110 including the assembly combustion face 200, remains substantially the same throughout operation of the rocket motor. In one example, the refractory nozzle fittings 114 are constructed with, but not limited to, pyrolytic graphite, tungsten, and the like.

The insulator grid 116 coupled along the plurality of nozzle fittings 114 and the grid support plate 112 provides an insulating layer to the components of the multi-nozzle grid assembly 110. The insulator grid ensures the fittings 114 and the support plate 112 are at least partially insulated from the high temperatures within the combustion chamber (e.g., the combustion chamber 102 shown in FIG. 1A). Additionally, the insulator grid 116 acts to cool the plurality nozzle fittings 114 and the support plate 112. Optionally, the insulator grid 116 is constructed with, but not limited to, silica phenolic, cellulose phenolic, and the like.

As described above, in one example, the insulator grid 116 is an ablative insulator grid and sacrificial ablation cools the components of the multi-nozzle grid assembly 110 during operation of the rocket motor 100. As will be described in further detail below, in one example, the ablative fragments of the insulator grid 116 are directed through the nozzle 118. The ablated fragments physically remove heat otherwise present within the multi-nozzle grid assembly 110 and pass the heated fragments through the nozzles 118 to cool the multi-nozzle grid assembly 110. In yet another example, the ablated fragments from the insulator grid 116 absorb latent heat from exhaust gases passing through the nozzle 118 and a phase change of the ablative fragments of the insulator grid 116 cools the components of the multi-nozzle grid assembly 110 including the nozzle fittings 114 and the grid support plate 112.

As shown in FIG. 4B, the nozzle 118 includes a contoured shape having a convergent nozzle portion 406 and a divergent nozzle portion 412. As will be described in further detail below, each of the components of the multi-nozzle grid assembly 110 contributes one or more of inlet and outlet surfaces that provide a continuous contoured shape to the nozzle 118 configured to ensure a desired thrust profile when exhaust gases are delivered through the nozzle 118. Referring again to FIG. 4B, the nozzle 118 includes a convergent nozzle portion 406 extending from the insulator grid 116 to a nozzle throat 410 (e.g., the nozzle throat 410 includes the smallest diameter portion of the nozzle 118). As will be described in further detail below, the convergent nozzle portion 406 includes a tapered inlet surface 408 providing a continuous taper extending across the insulator grid 116 and into the nozzle fitting 114. In a similar manner, the divergent nozzle portion 412 includes a tapered outlet surface 414. As shown in FIG. 4B, the tapered outlet surface 414 extends continuously from the nozzle fitting 114 through the grid support plate 112. Adjustment to the overall contour (and thereby the contour of one or more of the components of the multi-nozzle grid assembly) changes the performance characteristics of each nozzle 118 within the multi-nozzle grid assembly 110. The performance change of each of the nozzles 118 is similar to alterations of a nozzle shape or contour in a single nozzle rocket assembly. Stated another way, changing one or more of the convergent nozzle portion 406 and the divergent nozzle portion 412 alters desirable performance characteristics. Such performance characteristics include, but are not limited to, thrust, combustion chamber pressure, combustion chamber temperature and the like. Changes in contour and the diameter of the nozzles 118 tune these performance characteristics to ensure the rocket motor performs according to desired parameters.

For instance, in the example shown in FIG. 4B, the convergent nozzle portion 406 includes a substantially radial taper extending across the portions of the nozzle formed by the insulator grid 116 and part of the nozzle fitting 114. In a similar manner, the divergent nozzle portion 412 includes the tapered outlet surface 414 having a substantially frusto-conical surface. The convergent and divergent nozzle portions 406, 412 with the corresponding tapered inlet and tapered outlet surfaces 408, 414 are contoured in the manner shown to provide desirable performance characteristics (e.g., thrust, burn time and the like) for the rocket motor, such as the rocket motor 100 shown in FIGS. 1A and 1B. For instance, the convergent nozzle portions 406 (in the insulator grid 116) gradually taper from the intersection between nozzles to the nozzle throat 410. That is to say, the convergent nozzle portions 406 are rounded between adjacent nozzles 118 and without flat surfaces therebetween to ensure exhaust gases are funneled into the nozzles with substantially no (e.g., minimal) stagnation of the gases along the assembly combustion face 200. Stated another way, there is a smooth transition without angled corners (e.g., with a defined linear edge) from the assembly combustion face 200 to the convergent nozzle portions 406.

In another example, the multi-nozzle grid assembly 110 including the plurality of nozzles 118 are modeled as an equivalent single nozzle having an identical or near identical contour (but with a greater diameter) that fits within the corresponding footprint of the rocket motor 100. Modeling the assembly 110 with the plurality of nozzles 118 as an equivalent single nozzle facilitates performance evaluation; determination of the number, contour and size of the nozzles 118 to realize performance values; and evaluation of the grid assembly 110 surface area needed relative to the number of nozzles 118 to achieve specified pressure and thrust profiles.

In yet another example, and described in further detail below, the taper in at least the convergent nozzle portion 406, for instance, the taper of the insulator grid 116 as well as the nozzle fitting 114 is provided in part to direct exhaust gases over the insulator grid 116 and through the plurality of nozzle fittings 114. Exhaust gases entrain ablated fragments of the insulator grid 116 and the taper directs the exhaust gases with the entrained ablated fragments through the nozzle 118 to cool the plurality of nozzles of fittings 114 as well as the grid support plate 112 underlying the fittings 114. By cooling the plurality of nozzle fittings 114 and the grid support plate 112 through ablation of the insulator grid 116 the surface area of the assembly combustion face 200 remains substantially the same throughout operation of the rocket motor thereby optimizing the thrust generated (e.g., a thrust profile) of the rocket motor using the multi-nozzle grid assembly 110.

As described above and as further described below, the multi-nozzle grid assembly 110 maximizes the thrust for a plurality of nozzles such as the nozzles 118 through the use of contoured shapes extending through the multi-nozzle grid assembly 110. Stated another way, by providing a contoured shape for each of the nozzles 118 extending through the insulator grid 116, the plurality of nozzle fittings 114 and the grids support plate 112 exhaust gases are desirably funneled through the plurality of nozzles 118 and delivered through the nozzles 118 to optimize the thrust delivered through the multi-nozzle grid assembly 110. Further, the multi-nozzle grid assembly minimizes the weight of the nozzles within the rocket motor 100. For instance, an equivalent single long nozzle requires a large volume of material with a correspondingly large mass. In contrast, the multi-nozzle grid assembly 110 is relatively short compared to a single nozzle and thereby includes less volume and mass relative to the equivalent single nozzle. While the plurality of the nozzles 118 are less efficient in some examples than equivalent single nozzles the minimal weight of the multi-nozzle grid assembly 110 offsets this performance difference by making the overall rocket motor 100 substantially more light weight to optimize the rocket performance with the grid 110. The multi-nozzle grid assembly 110 is thereby capable of performing at similar performance levels to the equivalent single nozzle.

Further, the multi-nozzle grid assembly 110 acts as a screen throughout combustion of the propellant, such as the propellant 106, and as uncombusted propellant fragments becomes loose within the combustion chamber 102 the multi-nozzle grid assembly 110 acts as a screen and retains the loose fragments of propellant within the combustion chamber 102. The multi-nozzle grid assembly thereby ensures the propellant is fully combusted and accordingly ensures the rocket motor efficiently combusts the propellant and fully utilizes the fuel within the rocket motor to maximize the rocket performance.

Figure 5A:
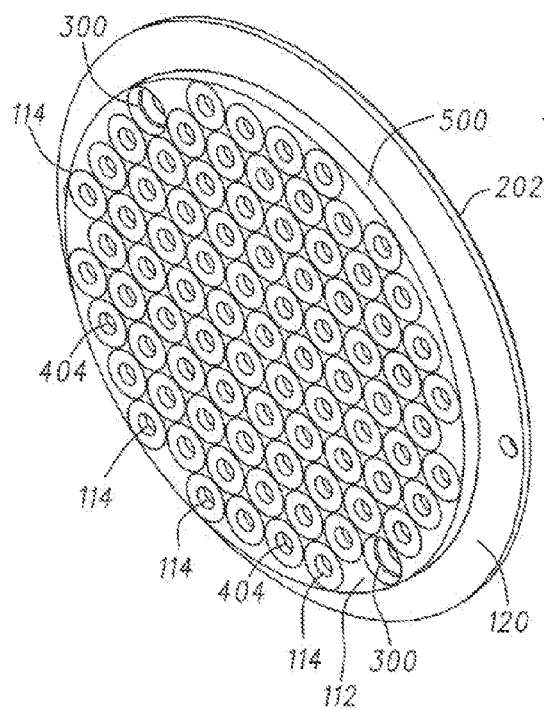
FIG. 5A is a perspective view of the grid support plate shown in FIG. 2 in accordance with some embodiments.

FIG. 5A shows one example of a grid support plate 112 for use in the multi-nozzle grid assembly 110 shown in FIGS. 1A, 1B and 2. As previously described, the grid support plate 112 provides a structural support that braces the other components in the multi-nozzle grid assembly 110. As shown in FIG. 5A, the grid support plate 112 includes a plate body 500 with the plurality of plate orifices 404 extending there through. For instance, the plate body 500 includes the plate orifices 404 extending from the plate coupling face 304 to the assembly exhaust face 202 on the opposed surface of the plate body 500. As previously described in one example, the grid support plate 112 further includes an installation flange 120 sized and shaped for engagement between a ring lip 122 and a housing end 124 as shown in FIG. 1B. As further shown in FIG. 5A, the plate body 500 includes the fitting cavities 300. The fitting cavities 300 are sized and shaped to receive one or more nozzle fittings such as the nozzle fittings 114 shown in FIG. 1B. Stated another way, the fitting cavities 300 are sized and shaped to each snugly receive a single nozzle fitting 114 therein. In one example, an adhesive or bonding agent is applied within the fitting cavity 300 to seat each of the nozzle fittings 114 within the individual fitting cavities 300. FIG. 5A further shows a plurality of nozzle fittings 114 positioned within the fitting cavities 300. Two of the fitting cavities 300 are shown with the nozzle fittings removed to illustrate the size and corresponding shape of the fitting cavities 300 relative to the nozzle fittings 114.

Figure 5B:
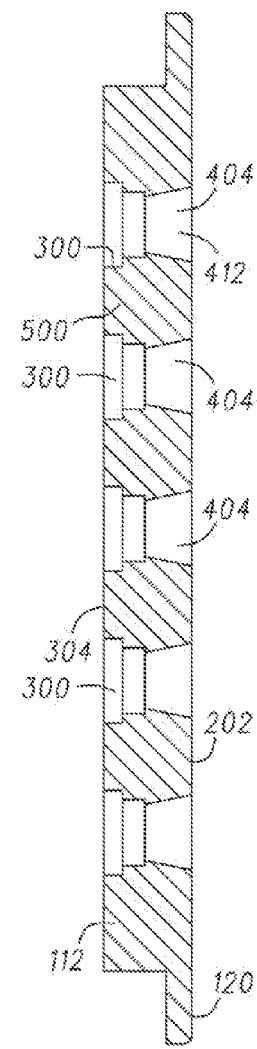
FIG. 5B is a cross sectional view of the grid support plate shown in FIG. 2 in accordance with some embodiments.
Figure 5C:
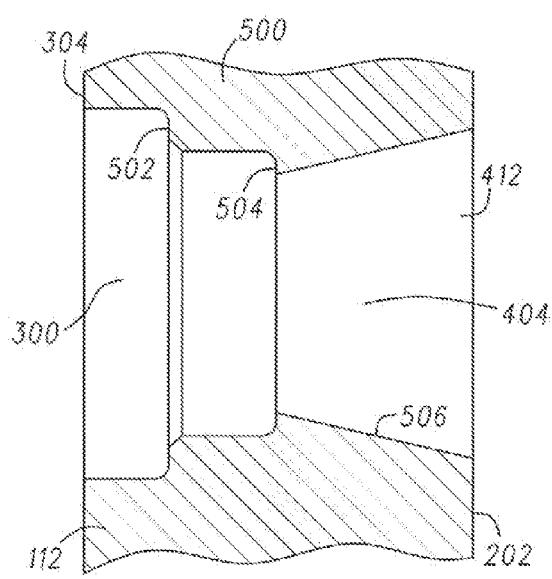
FIG. 5C is a detailed cross sectional view of a portion of the grid support plate shown in FIG. 2 in accordance with some embodiments.

Referring now to FIGS. 5B and 5C, the grid support plate 112 is shown in cross-section (the grid support plate 112 shown in FIG. 5C is a detailed view of a single plate orifice 404 extending through the plate body 500). As shown in FIG. 5B, the plurality of plate orifices 404 extend through the plate body 500. The plurality of plate orifices 404 are ranged in the plate body 500 to provide a corresponding number of nozzles such as the nozzles 118 shown in FIGS. 1A and 1B configured to generate a predicted thrust profile for the multi-nozzle grid assembly 110. For instance, during design the multi-nozzle grid assembly 110 is designed with a specified number of plate orifices 404 for a corresponding number of nozzles 118 to ensure the multi-nozzle grid assembly 110 is configured to provide a desired amount of thrust when operated with the rocket motor such as the rocket motor 100 shown in FIG. 1A. For instance, the plate body 500 is machined, molded and the like with the specified number of plate orifices 404 having a desired configuration (e.g., diameter, partial nozzle outlet contour and the like) to ensure the nozzles 118 with the nozzle fittings and the insulator grid 114, 116, respectively, are coupled with the grid support plate 112 to provide a plurality of nozzles 118 configured for providing a specified thrust profile for the rocket motor 100. Stated another way, the plate body 500 is provided with one or more plate orifices 404 spaced from other plate orifices 404 to ensure the corresponding nozzle 118 is formed within each of the plate orifices 404 to provide the specified thrust through the multi-nozzle grid assembly 110.

As shown, for instance, in FIG. 5A, the plurality of plate orifices 412 are positioned in substantially hexagonal configuration within the plate body 500. The plurality of plate orifices 404 are positioned within the plate body 500 to optimize the number of nozzles and correspondingly optimize the thrust generated through the multi-nozzle grid assembly 110. Other configurations of plate orifices 404 through the plate body 500 are equally applicable to the grid support plate 112 (e.g., a circular arrangement of orifices, a triangular arrangement, an octagonal arrangement and the like). With nearly any configuration of plate orifices 404 the interstitial portions of the grid support plate 112 continue to provide a structural bracing function to the other components of the multi-nozzle grid assembly 110 including the nozzle fittings 114 and the insulator grid 116.

Referring now to FIG. 5C, the grid support plate 112 is shown in detail with a single plate orifice 404. As previously described, a nozzle fitting, such as the nozzle fitting 114 shown in FIG. 1B, is positioned within the plate orifice 404 to form at least a part of one nozzle 118 (see FIG. 1B). As shown in FIG. 5C, the grid support plate 112 includes first and second plate flanges 502, 504 formed within the plate body 500. The first and second plate flanges 502, 504 are in one example annular flanges extending around the plate orifice 404. In another example, the grid support plate 112 includes a single plate flange as opposed to first and second plate flanges 502, 504. In still another example, one or more of the first and second plate flanges 502, 504 extends around only a portion of the plate orifice 404.

Further, as previously described, the grid support plate 112 forms a portion of the tapered outlet surface 414 shown in FIGS. 4A and 4B. For instance, the tapered outlet surface 414 includes corresponding surfaces within the nozzle fitting 118 and the grid support plate 112. As shown in FIG. 5C, a tapered plate outlet surface 506 forms a portion of the tapered outlet surface 414. The divergent nozzle portion 412 is bounded by the tapered outlet surface 414 including the tapered plate outlet surface 506.

As previously described, the grid support plate 112 provides structural support (e.g., bracing) to the other components of the multi-nozzle grid assembly 110 including, for instance the nozzle fittings 114 and the insulator grid 116. That is to say, the grid support plate 112 ensures the nozzle fittings 114 and the insulator grid 116 are supported throughout operation of the rocket motor 100 where high pressure exhaust gases having extremely high temperatures impinge upon the multi-nozzle grid assembly 110. The grid support plate 112 ensures the insulator grid 116 and the plurality of nozzle fittings 114 are sufficiently supported within the multi-nozzle grid assembly 110 and thereby substantially prevents mechanical failure, for instance, cracking, warping, deformation and the like of the multi-nozzle grid assembly 110 when impinged with high pressure and high temperature exhaust gases. In one example, the grid support plate 112 is constructed with one or more metals including, but not limited to, steel. In one example, the grid support plate 112 includes P20 tool steel, maraging steel (martensitic aged steel), heat treated steels and the like. The high tensile modulus of the materials incorporated within the grid support plate 112 substantially prevents the mechanical failure of the multi-nozzle grid assembly 110 when subjected to the high pressures of the exhaust gases impinging against the grid assembly (e.g., the assembly exhaust face 202 shown in FIG. 2). The pressure incident on the assembly exhaust face 202 is transmitted through the multi-nozzle grid assembly 110 and distributed across the plate body 500 of the grid support plate 112. The grid support plate 112 braces the components of the multi-nozzle grid assembly 110 and substantially prevents mechanical failure including, for instance, as described above cracking, deformation, warping and the like. As described above and described further below, the other components of the multi-nozzle grid assembly 110 such as the insulator grid 116 and the nozzle fittings 114 insulate the multi-nozzle grid assembly 110 including the grid support plate 112 from the high temperatures of the exhaust gases generated by the rocket motor 100.

The grid support plate 112 efficiently supports the other components (e.g., the plurality of nozzle fittings 114 and the insulator grid 116) with a structural substrate or matrix in a light weight manner compared to other configurations including, for instance using a large volume of refractory material such as the material of the plurality of nozzle fittings 114. Refractory materials used in multi-nozzle grids are generally a heavier component relative to the materials of the grid support plate 112. Refractory materials lack the tensile strength of the grid support plate 112, and a larger volume of refractory material (with an attendant increase in weight) is needed to adequately support a unitary multi-nozzle grid constructed with refractory materials to withstand the high pressure of rocket exhaust gases. Stated another way, to provide sufficient structural support to the plurality of nozzles of a unitary grid assembly without the grid support plate 112 a large volume of refractory material is needed compared to the grid support plate 112 of the multi-nozzle grid assembly 110. This large volume of material is relatively heavier than the smaller volume of material used in the grid support plate 112 (e.g., the materials used in a unitary refractory grid are heavier than the thinner grid support plate 112 constructed with structurally robust materials having high tensile strength such as maraging steel, P20 tool steel, heat treated steels and the like). Further, as described above and further described below, the nozzle fittings 114 and insulator grid 116 insulate the grid support plate 112 at least partially against the high temperatures of the exhaust gases generated within the rocket motor 100. The nozzle fittings 114 and the insulator grid 116 thereby substantially ensure that the materials of the grid support plate 112 are able to structurally support the multi-nozzle grid assembly 110 even though the materials of the grid support plate 112, at least in one example, are not refractory (e.g., having a relatively high thermal resistivity like a pyrolitic graphite used in the plurality of nozzle fittings 114).

Figure 6A:
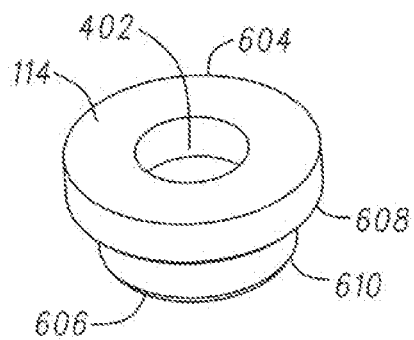
FIG. 6A is a perspective view of one example of a nozzle fitting sized and shaped for reception within the grid support plate in accordance with some embodiments.
Figure 6B:
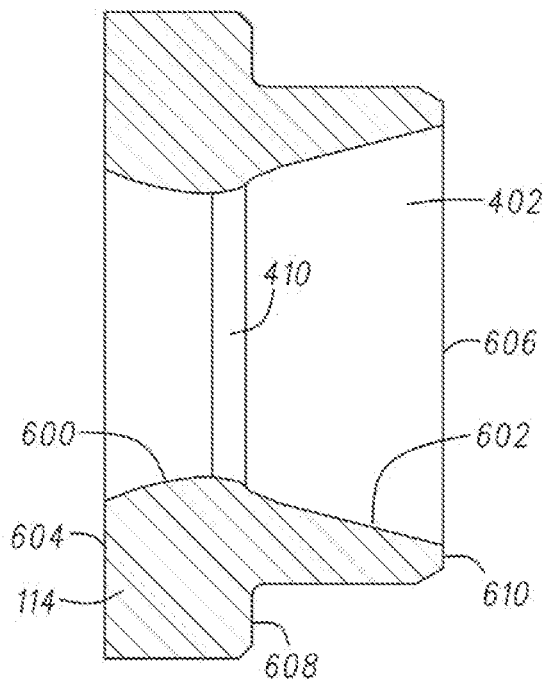
FIG. 6B is a cross sectional view of the nozzle fitting shown in FIG. 6A in accordance with some embodiments.

FIGS. 6A and 6B show one example of a nozzle fitting 114. As previously described, a plurality of nozzles fittings 114 are coupled within the multi-nozzle grid assembly 110, for instance between the insulator grid 116 and the grid support plate 112. The plurality of nozzle fittings 114, in one example, include refractory materials that are thermally resistant to the high temperatures generated with exhaust gases within the rocket motor, such as the rocket motor 100 shown in FIG. 1A. Referring first to FIG. 6A, the nozzle fitting 114 is shown with the fitting orifice 402 extending there through. In one example, the nozzle fitting 114 includes a fitting inlet face 604 directed toward the insulator grid 116 when assembled with the multi-nozzle grid assembly 110, as shown in FIG. 3. Additionally, the nozzle fitting 114 further includes a fitting outlet face 606 sized and shaped for reception within the grid support plate 112.

Referring again to FIGS. 6A and 6B, the nozzle fitting 114 includes first and second fitting flanges 608, 610. The first and second fitting flanges 608, 610 are in one example, sized and shaped for engagement with the corresponding first and second plate flanges 502, 504 shown in FIG. 5C. In a similar manner to the first and second plate flanges 502, 504, the first and second fitting flanges 608, 610, in one example, are annular flanges extending around the perimeter of the nozzle fitting 114. In another example, the first and second fitting flanges 608, 610 have a corresponding shape to the first and second plate flanges 502, 504. For instance, the first and second fitting flanges 608, 610 have a discontinuous or non-annular configuration and thereby engage with the correspondingly shaped first and second plate flanges 502, 504 by engagement of the corresponding flanges (e.g., by rotation of the plurality of nozzle fittings 114 to align corresponding features of the plate and fitting flanges). Optionally, the first and second fitting flanges 608, 610 along with the first and second plate flanges 502, 504 provide surfaces for the reception of a bonding agent such as a high temperature silicone adhesive. The silicone adhesive is applied between the nozzle fittings 114 and the grid support plate 112 to securely seat the plurality of nozzle fittings 114 within the fitting cavities 300 on the grid support plate 112 (e.g., see FIGS. 4A and 4B).

Referring now to FIG. 6B, the nozzle fitting 114 is shown in cross-section. As shown the nozzle fitting 114 includes the throat 410 of the nozzle 118, as shown in FIGS. 1B and 4B. Further, the nozzle fitting 114 includes portions of the convergent nozzle portion 406 and the divergent nozzle portion 402 shown in FIG. 4B. Stated another way, the inner surfaces such as a fitting inlet surface 600 and a fitting outlet surface 602 form part of the continuous tapered inlet surface 408 and tapered outlet surface 404, respectively of the convergent and divergent nozzle portions 406, 412 shown in FIG. 4B. The surfaces of the nozzle fitting 114, such as the fitting inlet surface 600 and the fitting outlet surface 602, cooperate with the other surfaces of the convergent and divergent nozzle portions 406, 412 to form a continuous nozzle shape extending through the convergent and divergent portions of the nozzle 118, as shown in FIG. 4B. Referring again to FIG. 6B, the fitting inlet surface 600 extends from the fitting inlet face 604 toward the throat 410 formed within the nozzle fitting 114. Similarly, the fitting outlet surface 602 tapers from the fitting outlet face 606 to the throat 410.

The nozzle fitting 114 is constructed with both the fitting inlet surface 600 and the fitting outlet surface 602 to effectively insulate the grid support plate 112 from high temperature exhaust gases delivered through the plurality of nozzles 118 (see FIG. 1B). That is to say, the plurality of nozzle fittings 114 receive the high temperature exhaust gases and facilitate the delivery of the high temperature exhaust gases through the fitting orifices 402 of the fittings 114 prior to reception within the plate orifices 404 of the grid support plate 112 shown in FIG. 5C. As will be described in further detail below, the insulator grid 116 cooperates with the plurality of nozzle fittings 114 to cool the exhaust gases prior to delivery through the plate orifices 404 and thereby ensures the grid support plate 112 is not subjected to otherwise higher temperature exhaust gases. The grid support plate 112 is thereby able to provide structural bracing to the multi-nozzle grid assembly 110 without being exposed to high temperature exhaust gases received (and cooled) within the nozzle fittings 114 and the insulator grid 116.

In one example, the plurality of nozzle fittings 114 are constructed with, but not limited to, refractory materials, for instance pyrolitic graphite or tungsten. As described above, the plurality of nozzle fittings 114 insulate the grid support plate 112 from high temperature exhaust gases generated within the rocket motor 100 (see FIG. 1A). Additionally, the refractory materials of the plurality of nozzles 114 ensure the nozzle fitting 114 is capable of maintaining the contour of the plurality of nozzles 118 including the shape and diameter of the nozzles 118. The plurality of nozzle fittings 114 thereby substantially maintain the surface area of the multi-nozzle grid assembly 110 and minimize any changes of the surface area during combustion within the rocket motor, for instance, through erosion of the nozzle contour or widening of the nozzle. Stated another way, the plurality of nozzle fittings 114 insulate the remainder of the multi-nozzle grid assembly 110 (including the grid support plate 112) from high temperature exhaust gases and at the same time maintain the contour of the plurality of nozzles 118. By maintaining the surface area of the assembly combustion face 200 substantially static during operation of the rocket motor 100 (through maintenance of the nozzle contour and diameter) a desired pressure profile is maintained within the combustion chamber 102 which ensures the propellant 106 is consumed within a high pressure environment that thereby generates exhaust gases having a corresponding desirable thrust profile when directed through the multi-nozzle grid assembly 110.

Figures 7A, 7B, 7C:
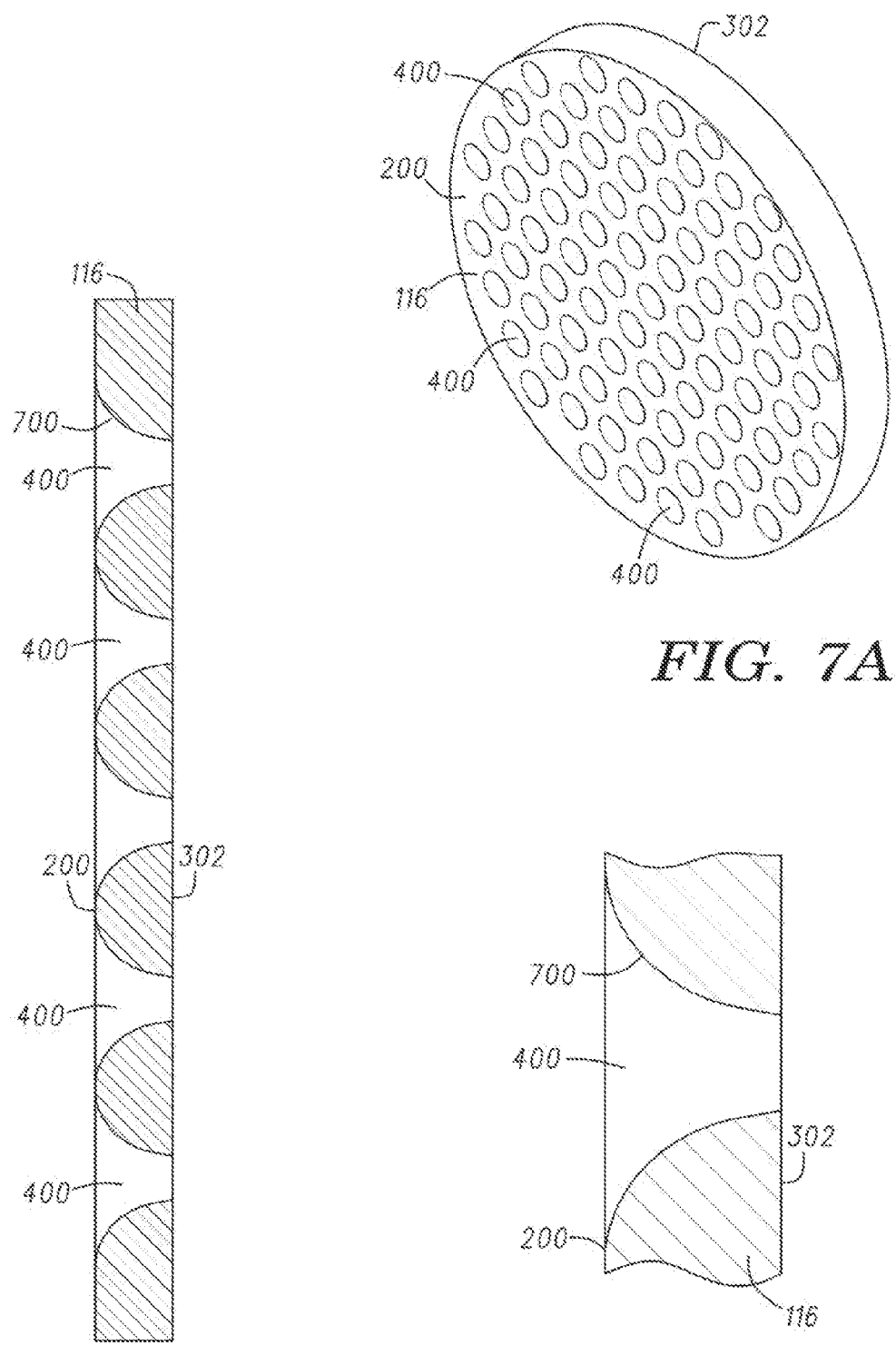
FIG. 7A is a perspective view of the insulator grid in accordance with some embodiments.
FIG. 7B is a cross sectional view of the insulator grid shown in FIG. 7A in accordance with some embodiments.
FIG. 7C is a detailed cross sectional view of the insulator grid shown in FIG. 7B in accordance with some embodiments.

FIGS. 7A-7C show various views of the insulator grid 116. The insulator grid 116, as previously described, is one component of the multi-nozzle grid assembly 110 (see FIG. 3). Referring first to FIG. 7A, the insulator grid 116 includes insulator orifices 400 extending through the insulator grid from the assembly combustion face 200 to the insulator coupling face 302. The insulator coupling face 302 is sized and shaped for coupling with a plate coupling face 304 of the grid assembly, as shown in FIG. 3. In one example, the insulator orifices 400 have an identical arrangement (e.g., grid pattern) to the plate orifices 404 formed within the grid support plate 112. As previously described, a plurality of nozzle fittings 104 are positioned within fitting cavities 300 of the grid support plate 112. The fitting orifices 402 of the plurality of nozzle fittings 114 thereby align with the insulator orifices 400 and the plate orifices 404 to form the plurality of nozzles 118 of the multi-nozzle grid assembly 110 (see FIG. 1B). As with the grid support plate 112, the plurality of insulator orifices 400 in the insulator grid 116 are shaped, sized and arranged according to the desired thrust profile of the multi-nozzle grid assembly 110. For instance, the insulator orifices 400 are packed in a tight or spaced apart pattern (with specified contours and diameters) to provide a larger or smaller number of corresponding nozzles 118 for delivery of exhaust gases through the nozzle to generate a desired thrust profile with the multi-nozzle grid assembly 110.

Referring now to FIGS. 7B and 7C, the insulator grid 116 is shown in cross section. As shown, the insulator grid 116 includes a tapering insulator inlet surface 700 extending along each of the insulator orifices 400. As previously described, the plurality of nozzles 118 includes a convergent nozzle portion 406 as shown in FIGS. 4A and 4B. A taped inlet surface 408 extends around the convergent nozzle portion 406 and forms the contoured shape of the convergent nozzle portion. At least a portion of the tapered inlet surface 408 includes the tapering insulator inlet surface 700 shown in FIGS. 7B and 7C. The tapering insulator inlet surface 700 in one example provide one portion of a continuous tapering inlet surface 408, as shown in FIGS. 4A and 4B. That is to say, the tapering insulator inlet surfaces 700 shown in FIGS. 7B and 7C cooperate with the fitting inlet surfaces 600 of the plurality of nozzle fittings 114 to provide a continuous tapered contour (such as a radial contour) to the convergent nozzle portion 406 of the nozzles 118. The continuous contour in the convergent nozzle portion 406, as well as the divergent nozzle portion 412 (including, for instance, portions of the nozzle fittings 114 and the grid support plate 112) provide a continuous contoured and tapered shape to the plurality of nozzles 118 as shown in FIG. 4B. As previously discussed herein, the taper and contour of each of the tapering insulator inlet surfaces 700, tapered plate outlet surfaces 506, and fitting inlet and outlet surfaces 600, 602 are contoured to ensure the plurality of nozzles 118 of the multi-nozzle grid assembly 110 as shown in FIG. 4A have a consistent, continuous contour and thereby provide a desired thrust profile when used in combination with the rocket motor 100. Stated another way, the multiple components of the multi-nozzle grid assembly 110 cooperate to provide continuous contoured nozzles 118 and each component contributes to the specified thrust profile for the multi-nozzle grid assembly 110.

In one example, the insulator grid 116 includes an ablative material, for instance, silica phenolic, cellulose phenolic, and the like. The insulator grid 116, including ablative materials, is configured to sacrificially ablate during operation of the rocket motor 100. Stated another way, as high pressure and high temperature exhaust gases impinge against the insulator grid 116, the exhaust gases gradually erode the insulator grid 116 and direct the ablated fragments of the grid through the plurality of nozzles 118 of the multi-nozzle grid assembly 110 (see FIG. 4A). That is to say, the exhaust gases entrain ablated fragments of the insulator grid 116 therein and the exhaust gases with the entrained fragments are directed through the plurality of nozzles 118. As described above and further described herein below, ablation of the insulator grid 116 removes high temperature heated portions of the insulator grid from the multi-nozzle grid assembly 110. These high temperature fragments are directed through the plurality of nozzles 118 thereby insulating the multi-nozzle grid assembly 110 from further interaction with the high temperature fragments. In effect, the ablated fragments entrained with the exhaust gases remove heat from the multi-nozzle grid assembly 110 and thereby insulate the plurality of nozzle fittings 114 and the grid support plate 112 from further exposure to the otherwise high temperature fragments.

Additionally, the ablated fragments continue to absorb heat from the exhaust gases as they pass through the plurality of nozzle fittings 118. In one example, the ablated fragments absorb latent heat from the exhaust gases and change from a solid state to a liquid state while moving through the plurality of nozzles 118. In still another example, the ablated fragments continue to absorb latent heat and transition from a liquid to a gas state while passing through the nozzles 118. By absorbing latent heat, the ablated fragments cool the exhaust gases as they travel through the plurality of nozzles 118. The plurality of nozzle fittings 114 as well the grid support plate 112 are thereby exposed to lower temperature exhaust gases. By exposing the plurality of nozzle fittings 114 and the grid support plate 112 to lower temperature exhaust gases, the fittings 114 are better able to maintain their contour and diameter throughout operation of the rocket motor 100. Further, the grid support plate 112 has greater structural integrity (e.g., tensile strength) when exposed to lower temperature exhaust gases and is better able to brace the other components of the multi-nozzle grid assembly 110, such as the plurality of nozzle fittings 114 and the insulator grid 116.

Referring again to FIGS. 7B and 7C, the tapering insulator inlet surfaces 700 of the insulator grid 116 ensure the ablated fragments of the insulator grid are directed into the plurality of nozzles 118 (see FIGS. 4A, 4B). Stated another way, as high temperature and high pressure exhaust gases impinge upon the insulator grid 116, the tapering insulator inlet surfaces 700 of the grid direct the ablated fragments entrained within the exhaust gases through the insulator orifices 400 and into the remaining portions of the plurality of nozzles 118, such as the fitting orifices 402 of the plurality of nozzle fittings 114 and the plate orifices 404 of the grid support plate 112. The ablated fragments are thereafter able to carry out their cooling function through phase changes and the like while passing through the plurality of nozzle fittings 114 and the grid support plate 112.

As described above, the insulator grid 116 in one example is constructed with an ablative material. The insulator grid gradually erodes during operation of the rocket motor 100. As described in further detail below, erosion of the insulator grid 116 results in a decrease in thickness of the insulator grid 116 while the overall surface area of the insulator grid 116 remains substantially the same during operation of the rocket motor 100. That is to say, the diameter and contour of the plurality of insulator orifices 400 shown in FIGS. 7B and 7C remain substantially the same (with minimal erosion) during operation of the rocket motor and the overall surface area, for instance, of the assembly combustion face 200 shown in FIG. 2 correspondingly remains substantially the same. The nozzle fittings 114 cooperate with the insulator grid 116 and maintain the contour and diameter of the plurality of nozzles 118 within the plurality of nozzle fittings 114. The cooperation of the insulator grid 116 with the plurality of nozzle fittings 114 thereby ensures the surface area of the multi-nozzle grid assembly 110 remains substantially the same throughout operation of the rocket motor 100. That is to say, during operation of the rocket motor 100 the contour and diameter of the plurality of nozzles 118 changes a relatively small amount through gradual controlled erosion of the materials of the multi-nozzle grid assembly 110 (relative to other multi-nozzle grid designs, for instance, unitary grids).

As described above, the insulator grid 116 is constructed with an insulating material that protects the plurality of nozzle fittings 114 as well as the grid support plate 112. In addition to specifying the material for the insulator grid 116 (e.g., an ablative material), the thickness of the insulator grid 116 is chosen according to performance requirements for the rocket motor 100. For instance, where a longer burn time is desired, the insulator grid 116 includes an enhanced thickness to ensure the other components of the multi-nozzle grid assembly 110 are protected during combustion of the propellant 106 and delivery of exhaust through the plurality of nozzles 118. In one example, where the insulator grid 116 is constructed with ablative material, a thicker grid 116 facilitates the production of ablated fragments throughout operation of the rocket motor 100 and thereby ensures the nozzle fittings 114 and the grid support plate 112 are correspondingly insulated through operation of the rocket motor. Additionally, by producing additional ablated fragments (for longer burns) the nozzles 118 and the surface area of the multi-nozzle grid assembly 110 remain substantially the same throughout operation. In another example, where a shorter burn time is desired a relatively thinner insulator grid 116 is used.

In operation, the rocket motor 100 delivers exhaust gases through the multi-nozzle grid assembly 110. For instance, the propellant 106 is ignited within the combustion chamber 102 as shown in FIG. 1A. Exhaust gases are generated within the combustion chamber 102 and thereafter directed through the plurality of nozzles 118 within the multi-nozzle grid assembly 110 (see, for instance, FIG. 4A). The exhaust gases impinging upon the multi-nozzle grid assembly 110 are directed through the plurality of nozzles 118.

The convergent and divergent nozzle portions 406, 412 including the components of the tapered inlet and outlet surfaces 408, 414 direct the exhaust gases through the plurality of nozzles 118 to generate a specified thrust profile. As described above, the tapering insulator inlet surfaces 700 cooperate with the fitting inlet surfaces 600 to form the tapered inlet surfaces 408 extending annularly around the convergent nozzle portions 406. In a similar manner, the fitting outlet surfaces 606 of the plurality of nozzle fittings 114 cooperate with the corresponding tapered plate outlet surfaces 506 of the grid support plate 112 to form the tapered outlet surface 414 extending annularly around the divergent nozzle portion 412. The components of the multi-nozzle grid assembly 110 thereby form continuous contoured nozzles configured to provide a specified thrust profile in a similar manner to the contoured nozzle of a unitary single nozzle design.

During operation the exhaust gases from the combustion chamber 102 impinge upon the insulator grid 116. As previously described, the insulator grid 116 ablates as the high pressure exhaust gases pass over the grid. The tapering insulator inlet surfaces 700 carry heated ablated fragments and direct the ablated fragments into the plurality of nozzles 118 as shown in FIGS. 7B and 7C. Referring now to FIGS. 4A and 4B, the ablated fragments entrained in the exhaust gases are directed through the plurality of nozzles 118. Removal of the heated ablated fragments prevents conduction of heat from the fragments to the remainder of the insulator grid 116 (as well as the plurality of nozzle fittings 114 and the grid support plate 112). The ablated fragments are directed through the plurality of nozzle fittings 114 and the grid support plate 112, for instance, the fitting orifices 402 and the plate orifices 404, respectively. While passing through the fitting and plate orifices 402, 404 the ablated fragments continue to absorb heat from the exhaust gases. In one example, the ablated fragments absorb latent heat and transition from a solid to liquid state and then from the liquid state to a gas state while moving through the plurality of nozzles 118. The heat absorbed by the ablated fragments as they pass through the plurality of nozzles 118 effectively cools the plurality of nozzle fittings 114 and the grid support plate 112. The plurality of nozzle fittings 114 including the refractory materials are thereby able to more effectively maintain their contour and diameter throughout the operation of the rocket motor 100. Additionally, the grid support plate 112 is able to brace the components of the multi-nozzle grid assembly 110 (the insulator grid 116 and the plurality of nozzle fittings 114) throughout operation of the rocket motor 100. That is to say the grid support plate 112 is exposed to exhaust gases having a substantially lower temperature (e.g., 100° C.) because of the cooling effect of the ablated fragments as they pass through the nozzles 118. The grid support plate 112 thereby supports the multi-nozzle grid assembly 110 throughout operation of the rocket motor with a higher tensile strength (compared to the plate when exposed to raw exhaust gases that have not been cooled) and ensures that the multi-nozzle grid assembly 110 is consistently and reliably free of mechanical failure, such as deformation, cracking, warping, and the like throughout operation of the rocket motor 100.

As previously described, the insulator grid 116 ablates during operation of the rocket motor 100. In one example, the ablation of fragments from the insulator grid 116 is a controlled erosion of the insulator grid 116. That is to say the insulator grid 116 ablates and decreases in thickness while maintaining substantially the same surface area relative to the multi-nozzle grid assembly 110 prior to combustion of the propellant 106. A controlled erosion of the insulator grid 116 is configured to cool the components of the multi-nozzle grid assembly including, for instance, the plurality of nozzle fittings 114 and the grid support plate 112. The controlled erosion of the insulator grid 116 decreases the thickness of the insulator grid 116, but at the same time maintains the overall surface area of the insulator grid 116 and also ensures the plurality of nozzle fittings 114 maintain their contoured shape and substantially maintain their diameter throughout operation of the rocket motor. By maintaining the surface area of the multi-nozzle grid assembly 110, for instance, through maintenance of the nozzle fitting diameter, the contour of the nozzles 118, as well as the surface area the insulator grid 116, a specified pressure (e.g., pressures within a pressure profile) is maintained within the combustion chamber 102 (see FIG. 1A). Stated another way, uncontrolled erosion of the multi-nozzle grid assembly 110 is substantially prevented. Instead, controlled erosion is facilitated to maintain the grid assembly 110 and correspondingly maintain pressure within the combustion chamber according to a desired pressure profile. By maintaining a pressurized environment within the combustion chamber 102 the propellant 106 is predictably consumed within the combustion chamber 102 during operation of the rocket motor 100. Because the propellant 106 is predictably consumed during operation and pressure is desirably maintained according to a profile, the thrust profile generated through the multi-nozzle grid assembly 110 correspondingly follows a desired and predicted profile.

Furthermore, because the surface area of the multi-nozzle grid assembly 110 is maintained throughout operation of the rocket motor 100, the multi-nozzle grid assembly 110 is configured to screen loose fragments of propellant 106 freed during combustion of the propellant within the combustion chamber 102. That is to say, as fragments of the propellant 106 free themselves from the overall propellant charge during combustion the fragments are screened by the multi-nozzle grid assembly 110 and substantially retained within the combustion chamber 102 until combusted. The rocket motor 100 is thereby able to efficiently consume substantially the entire propellant charge 106. The combination of the maintenance of the pressure and thrust profiles as well as the full combustion of the propellant 106 ensures that the rocket motor 100, including the multi-nozzle grid assembly 110, efficiently consumes the propellant 106 and operates to provide the desired and specified amount of thrust in an efficient manner with a lightweight multi-nozzle grid assembly 110 relative to previous single nozzle designs and previous unitary multi-nozzle grids.

Figure 8:
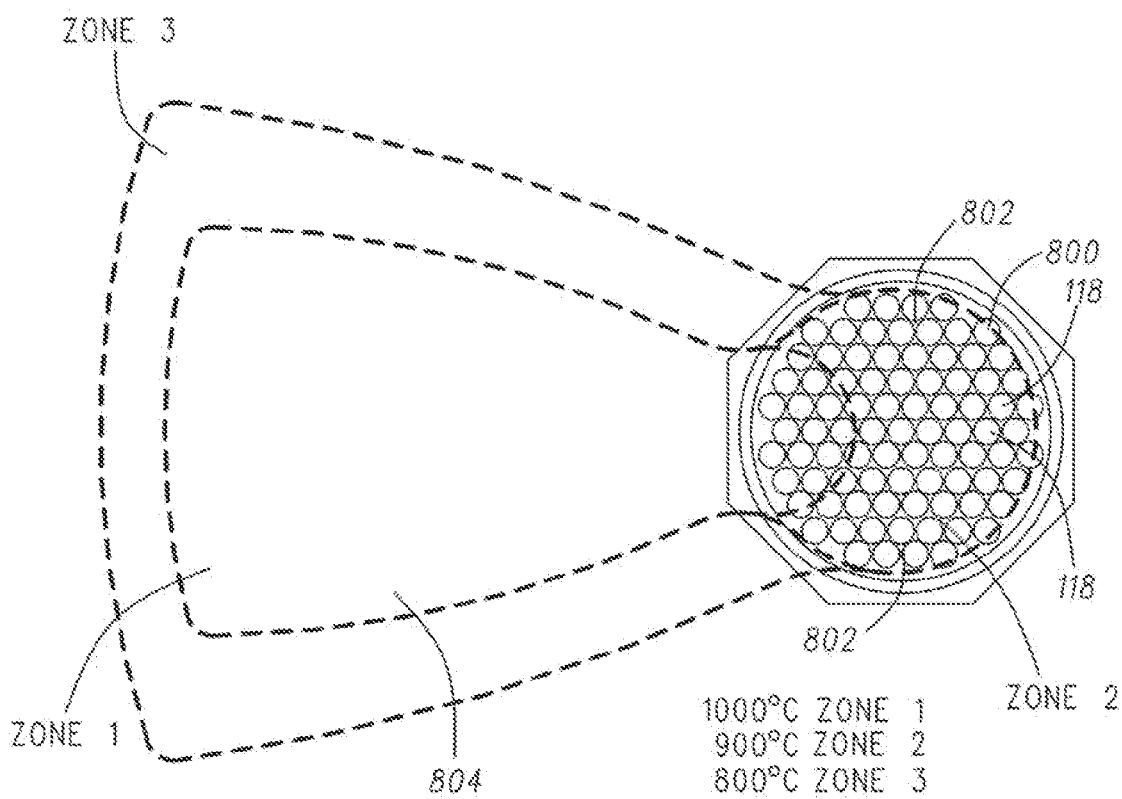
FIG. 8 is a thermal plot of an exhaust plume emanating from the rocket multi-nozzle grid assembly shown in FIG. 2 in accordance with some embodiments.

Referring now to FIG. 8, one example of a rocket motor 100 including the multi-nozzle grid assembly 110 is provided. The rocket motor 100 is shown in an operational state with an exhaust plume 800 directed through the multi-nozzle grid 110 from a plume base 802 to a plume end 804. As shown in the accompanying temperature scale, the plume base 802 has a temperature of approximately 900° C. while the plume end 804 has a temperature of approximately 1000° C. As previously described, the insulator grid 116 shown for instance in FIG. 7A-C is configured to insulate the other components of the multi-nozzle grid assembly 110 and ablate and direct ablated fragments of the insulator grid through the plurality of nozzles 118. The ablated fragments effectively cool the multi-nozzle grid assembly 110.

Referring again to FIG. 8, the plume base 802 is cooler than the plume end 804. As shown in FIG. 8 the multi-nozzle grid assembly 110 is exposed to the lower temperature exhaust gases (for instance, 900° C.) at the plume base 802. The multi-nozzle grid assembly 110 experiences these lower temperatures in part through the ablation of fragments from the insulator grid 116. That is to say because the multi-nozzle grid assembly 110 is exposed to exhaust gases at a lower temperature such as those shown with the plume base 802. The plurality of nozzle fittings 114 and the grid support plate 112 shown in FIG. 1B for example are thereby exposed to lower temperature exhaust gases. By exposing the fittings 114 and the grid support plate 112 to cooler exhaust gases the multi-nozzle grid assembly 110 is reliably structurally supported by the grid support plate 112 throughout operation of the rocket motor 100. That is to say the grid support plate 112 with a high tensile strength is insulated at least in part by the cooled exhaust gases and thereby able to substantially maintain a high tensile strength to brace the components of the multi-nozzle grid assembly 110 throughout operation of the rocket motor 100. Further, the delivery of cooled exhaust gases through the plurality of nozzles 118 exposes the plurality of nozzle fittings 114 to lower temperatures and thereby minimizes the rate of erosion of the plurality of nozzle fittings 114. By minimizing the erosion of the plurality of nozzle fittings 114 the surface area of the multi-nozzle grid assembly 110 is maintained substantially identical throughout combustion of the propellant within the rocket motor 100. Additionally, the contour of the plurality of nozzles 118 is substantially maintained throughout operation of the rocket motor 100 because erosion is substantially minimized through cooling of the exhaust gases as they pass through the plurality of nozzles 118. Additionally, the refractory materials in the plurality of nozzle fittings 114 have a high thermal resistance relative to other components of the multi-nozzle grid assembly 110 such as the grid support plate 112 and are thereby resistant to high temperature exhaust gases.

Figure 9A:
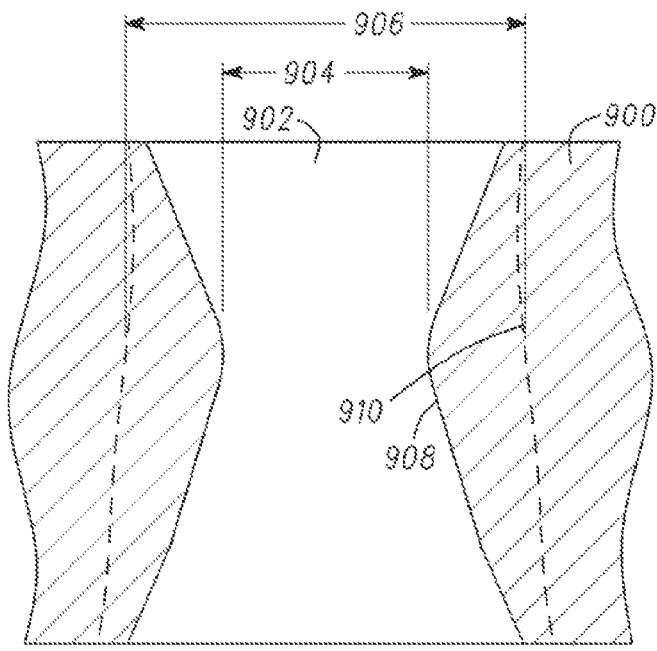
FIG. 9A is a cross sectional view of one example of a nozzle in original and eroded configurations for a prior art monolithic multi-nozzle grid in accordance with some embodiments.
Figure 9B:
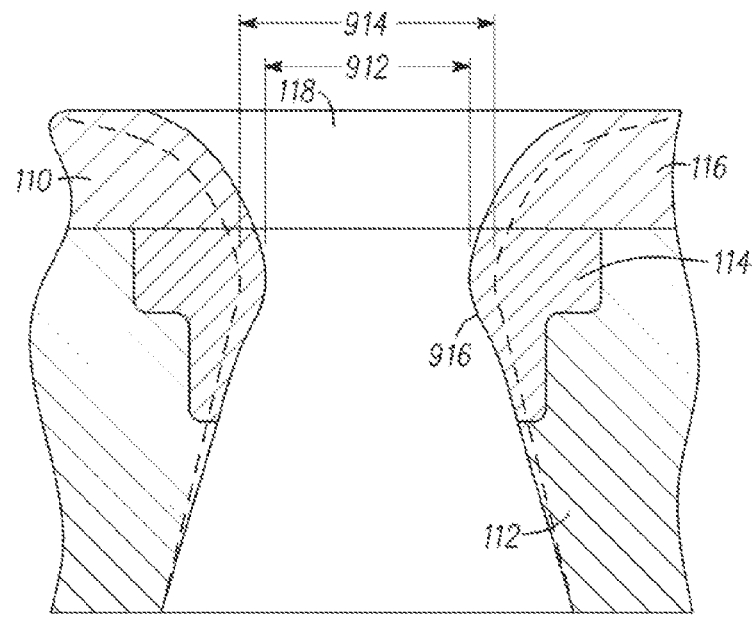
FIG. 9B is a cross sectional view of the rocket multi-nozzle grid assembly shown in FIG. 2 in original and eroded configurations in accordance with some embodiments.

FIGS. 9A and 9B show two examples of multi-nozzle grids. Referring first to FIG. 9A, a unitary multi-nozzle grid 900 is shown. The multi-nozzle grid 900 is shown in detail with a single unitary nozzle 902. The unitary multi-nozzle grid 900 when viewed from an overall perspective includes a plurality of nozzles 902 extending through a body (e.g., a body of refractory material). As shown in FIG. 9A, each of the unitary nozzles 902 includes an original diameter 904 and an original contour 908. The configuration of the unitary multi-nozzle grid 900 after combustion is shown in FIG. 9A as well. As shown in dashed lines the unitary nozzle 902 has a post combustion diameter 906 substantially larger than the original diameter 904. For instance, in one example the post combustion diameter 906 is around 34 millimeters larger than the original combustion diameter 904. Similarly, the unitary nozzles 902 of the unitary multi-nozzle grid 900 has a substantially larger post combustion contour 910 than the original contour 908 of the unitary nozzles 902.

Referring now to FIG. 9B, the multi-nozzle grid assembly 110 including the components previously described is provided. In the example shown, the multi-nozzle grid assembly 110 includes the grid support plate 112, the nozzle fitting 114, and the insulator grid 116. As previously described, the multi-nozzle grid assembly 110 includes a plurality of nozzle fittings 114 that cooperate with the other components of the multi-nozzle grid assembly to provide a plurality of nozzles 118 in FIGS. 4A and 4B.

Referring again to FIG. 9B, the multi-nozzle grid assembly 110 is shown in an original configuration and a post combustion configuration. In the original configuration, the multi-nozzle grid assembly includes nozzles 118 having an assembly original diameter 912 and a corresponding assembly original contour 916. As previously described, the assembly original contour 916 includes convergent and divergent portions of the nozzle 118 sized and shaped to provide specified performance characteristics (e.g., thrust and the like) throughout the operation of the rocket. FIG. 9B further shows the multi-nozzle grid assembly 110 in a post combustion configuration. As shown, the assembly includes an assembly post combustion diameter 914 substantially the same as the assembly original diameter 912. Further, the multi-nozzle grid assembly 110 further includes an assembly post combustion contour 918 (in dashed lines) substantially similar to the assembly original contour 916. When comparing the prophetic example shown in FIG. 9B with the unitary multi-nozzle grid 900 shown in FIG. 9A it is clear that the multi-nozzle grid assembly 110 retains substantially the same configuration between the original configuration and a post combustion configuration. In contrast, the unitary multi-nozzle grid 900 does not retain the same configuration. Stated another way, the contour and diameter of the multi-nozzle grid assembly 914, 918 remain substantially the same while that is not the case with the unitary multi-nozzle grid assembly 900.

As previously described herein, the ablated insulator grid 116 and the refractory nozzle fittings 114 cooperate to insulate the grid support plate 112 from the high temperature exhaust gases otherwise incident on the plate. The ablative insulator grid 116 and the plurality of nozzle fittings 114, for instance refractory nozzle fittings, insulate the grid support plate 112 and allow the grid support plate 112 to structurally brace the other components of the multi-nozzle grid assembly 110. Further, the insulator grid 116 ablates through a gradual erosion of the thickness of the insulator grid while the surface area of the insulator grid 116 is substantially maintained throughout the operation of the rocket motor 100. In a similar manner the refractory materials of the plurality of nozzle fittings 114 are configured to withstand the high temperature environment created with the exhaust gases and thereby substantially maintain their contoured configuration as shown in FIG. 9B. The ablating insulator grid 116 further substantially protects the plurality of nozzle fittings 114 and assists in maintaining the contour of the multi-nozzle grid assembly, 110 for instance between the assembly original contour 916 and the assembly post combustion contour 918.

As shown in FIG. 9B, there is a relatively small change in diameter between the assembly original diameter 912 and the assembly post combustion diameter 914. For instance, in one prophetic example the change of diameter between the diameters 912, 914 is around 5 millimeters compared to a 34 millimeter change for the unitary multi-nozzle grid 900 shown in FIG. 9A. The relatively small change in diameter results in a correspondingly minimal change of the surface area of the multi-nozzle grid assembly 110 (e.g., the surface area substantially identical throughout operation of the rocket motor 100). The multi-nozzle grid assembly 110 is thereby able to sustain a pressure within a desired pressure profile within a combustion chamber. By sustaining a pressure within the combustion chamber the rocket motor 100 including the multi-nozzle grid assembly 110 is able to accelerate the combustion of propellant and thereby provide thrust along a desired and predicted thrust profile. Further, by maintaining the area of the multi-nozzle grid assembly 110 the assembly continues to behave like a screen throughout combustion and effectively prevents the exit of uncombusted loose fragments of propellant, such as the propellant 106 shown in FIG. 1A. Instead, the loose propellant fragments are more fully burned within the combustion chamber 102 and thereby able to contribute to the overall thrust of the rocket motor 100. The thrust profile of the rocket motor 100 including the multi-nozzle grid assembly 110 is thereby optimized.

Figure 9C:
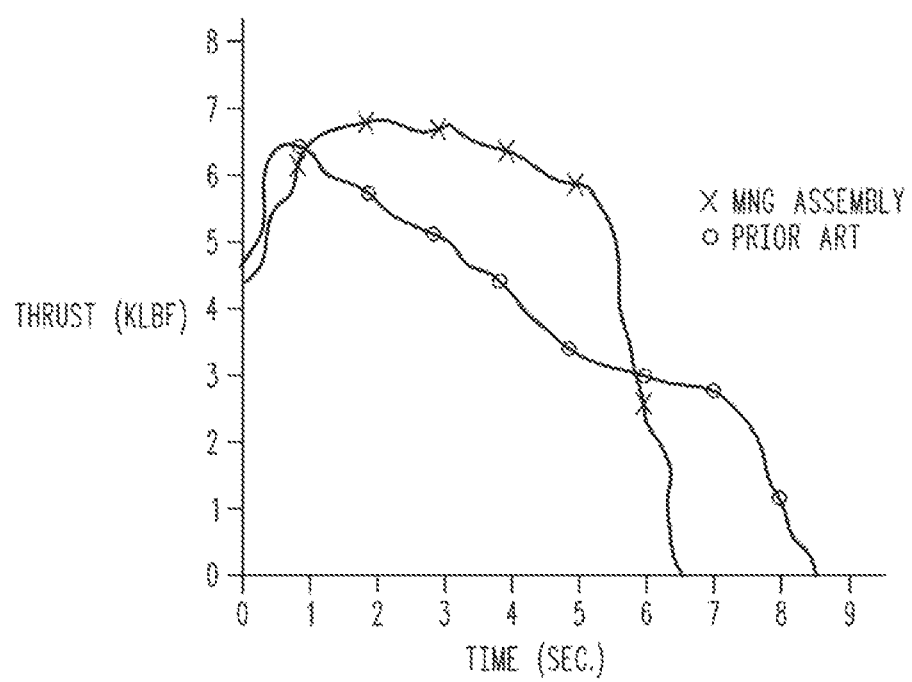
FIG. 9C is a plot of the thrust profiles for the prior art multi-nozzle grid shown in FIG. 9A and the rocket multi-nozzle grid shown in FIG. 9B in accordance with some embodiments.

Referring now to FIG. 9C, a plot of the thrust profiles for both the prior art unitary multi-nozzle grid 900 and the multi-nozzle grid assembly 110 are provided. As shown, the prior art thrust profile begins at relatively the same thrust as the multi-nozzle grid assembly 110 but then quickly falls with consistently lower thrust values until concluding its combustion at approximately 8.5 seconds. In contrast, the multi-nozzle grid assembly 110 has a consistently high thrust profile for instance between 6,000-7,000 pounds-force throughout combustion. The prior art unitary multi-nozzle grid 900 erodes the nozzles as shown in FIG. 9A to a large degree. This erosion greatly decreases the area of the grid 900 and thereby allows exhaust gases to easily escape the combustion chamber. This has two effects. The pressure in the chamber decreases steadily and the rate of combustion decreases (combustion is partly dependant on pressure to maintain a desirable combustion rate). Exhaust gases are thereby not generated under the high pressures possible with the multi-nozzle grid assembly 110 and therefore the prior art multi-nozzle grid cannot deliver the desired thrust profile as shown in the graphical representation of FIG. 9C.

In contrast to the prior art unitary multi-nozzle grid 900 the multi-nozzle grid assembly 110 has minimal erosion as shown in FIG. 9B and the surface area of the multi-nozzle grid assembly, for instance the assembly combustion face 200 shown in FIG. 2, remains substantially identical throughout combustion and operation of the rocket motor 100. For example, the multi-nozzle grid assembly 110 decreases in thickness but otherwise maintains the surface area of the assembly. The multi-nozzle grid assembly 110 thereby prevents the easy escape of exhaust gases. Instead, the exhaust gases are retained and directed out of the nozzles 118 having a consistent contour and diameter throughout combustion of the propellant 106. The consistent contour and diameter of the grid assembly 110 increases the pressure of the exhaust gases within the combustion chamber 102 (see FIG. 1A) relative to the prior art unitary multi-nozzle grid 900 and results in the generation of high pressure exhaust gases directed through consistently contoured nozzles. The exhaust gases thereby provide thrust along the desired and predicted thrust profile, as shown in FIG. 9C.

Figure 10:
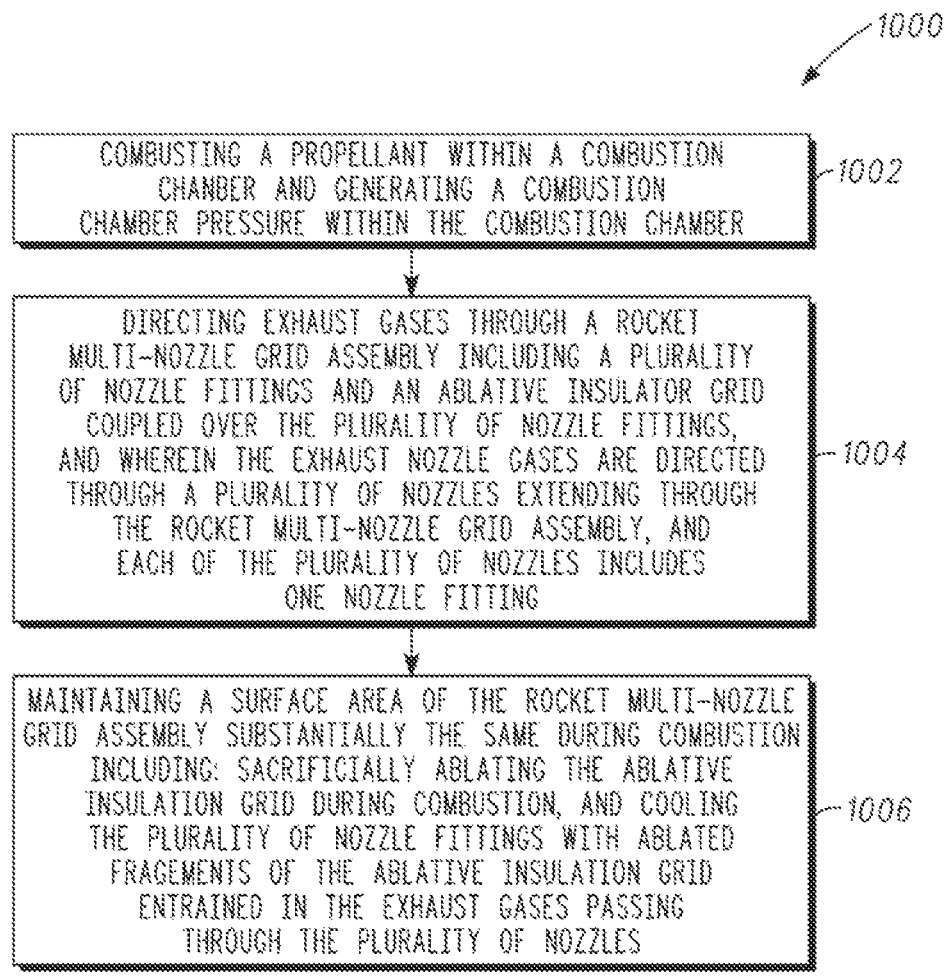
FIG. 10 is a block diagram showing one example of method of maintaining combustion chamber pressure with the rocket multi-nozzle assembly shown in FIG. 2 in accordance with some embodiments.

FIG. 10 shows one example of a method 1000 of maintaining a combustion chamber pressure with a rocket multi-nozzle grid assembly, such as the grid assembly 110 described herein. While describing the method 1000 reference will be made to elements and features previously described. Where reference is made in the description of the method 1000 to numbered features and element, such references are not intended to be limited to the previously described numbered features. Instead, the reference numbers are intended to be exemplary and all similar features and elements within the application as well as their equivalents are exchangeable with the element or feature described.

At 1002, the method 1000 includes combusting a propellant, such as the propellant 106 shown in FIG. 1A within a combustion chamber 102. Combustion of the propellant 106 generates a combustion chamber pressure within the combustion chamber 102. At 1004 exhaust gases are directed through a rocket multi-nozzle grid assembly 110. Referring to FIG. 1B, the multi-nozzle grid assembly 110 includes a plurality of nozzle fittings 114. In one example, the plurality of nozzle fittings 114 are seated within a grid support plate 112. The multi-nozzle grid assembly 110 further includes an ablative insulator grid 116 coupled over the plurality of nozzle fittings 114. The exhaust gases are directed through a plurality of nozzles 118 extending through the rocket multi-nozzle grid assembly 110. Each of the plurality of nozzle fittings includes one nozzle orifice 402. The insulator grid 116 includes a corresponding number of insulator orifices 400 sized and shaped to align with the plurality of nozzle fittings 114 (with orifices 402) to form the plurality of nozzles 118.

At 1006, the method 1000 includes maintaining a surface area of the rocket multi-nozzle grid assembly 110 substantially the same during combustion (e.g., operation of the rocket motor 100). Maintaining the surface area of the rocket multi-nozzle grid assembly includes for instance sacrificially ablating the ablative insulator grid 116 during combustion. In another example, maintaining the surface area includes cooling the plurality of nozzle fittings 114 with ablated fragments of the ablative insulator grid 116 where the ablated fragments are entrained in the exhaust gases passing through the plurality of nozzles 118.

Several options for the method 1000 are described below. In one example, maintaining the surface area of the rocket multi-nozzle grid assembly 110, for instance the surface area formed by an assembly combustion face 200, includes maintaining the combustion chamber pressure within a specified pressure profile. The pressure within the combustion chamber 102 may change to some predictable degree during operation of the rocket motor 100. However, the multi-nozzle grid assembly 110 ensures that the combustion chamber pressure remains within a specified pressure profile throughout operation of the rocket motor 100. As described above, the multi-nozzle grid assembly 110 is able to maintain the pressure in the combustion chamber 102 within the specified profile because the plurality of nozzles 118 each including a specified diameter and contour remain substantially the same throughout operation of the rocket motor 100. Stated another way, the effective surface area of the multi-nozzle grid assembly extending around each of the plurality of nozzles 118 remains substantially the same during operation of the rocket motor 100. In another example, the method 1000 further includes maintaining the thrust generated with the exhaust gases directed through the plurality of nozzles 118 within a specified thrust profile according to maintenance of both the rocket multi-nozzle grid assembly surface area and the combustion chamber pressure. Stated another way, by maintaining the surface area of the multi-nozzle grid assembly 110 substantially the same throughout operation of the rocket motor 100 the combustion chamber pressure within the combustion chamber 102 remains within the specified pressure profile. Optionally, the maintenance of the pressure within the combustion chamber 102 along with the consistent diameter and contour of each of the plurality of nozzles 118 ensures that exhaust gases directed through the plurality of nozzles 118 provide a specified amount of thrust throughout operation of the rocket motor 100. That is to say, the multi-nozzle grid assembly 110 cooperates with the rocket motor 100 to ensure that the thrust generated by the rocket motor 100 throughout operation while perhaps not being entirely consistent follows a specified thrust profile substantially without undesirable performance degradation.

In another example, maintaining the surface area of the rocket multi-nozzle grid assembly 110 substantially the same during combustion includes maintaining a tapered nozzle inner perimeter of each of the plurality of nozzle fittings substantially the same during combustion. For instance, the tapered nozzle inner perimeter includes one or more of the tapered inlet surface 408 and the tapered outlet surface 414 (as well as their component parts found in the plurality of nozzle fittings 114, the insulator grid 116, and a grid support plate 112) as shown in FIG. 4B. Optionally, sacrificially ablating the ablated insulator grid 116 maintains the tapered nozzle inner perimeter (e.g., one or more of the tapered inlet surface 408 and the tapered outlet surface 414) substantially the same during combustion. In yet another option, sacrificially ablating the insulator grid 116 maintains the contoured inlet and outlet surfaces of the nozzle fitting 114 substantially the same during combustion. In still another example, sacrificially ablating the ablative insulator grid 116 includes decreasing the thickness of the rocket multi-nozzle grid assembly 110 (e.g., through controlled erosion of the insulator grid 116) during combustion while maintaining the surface area of the rocket multi-nozzle grid assembly substantially the same. By maintaining the surface area of the multi-nozzle grid assembly 110 substantially the same the method 1000 further includes screening uncombusted and loose propellant such as propellant 106 from exhaust gases within the combustion chamber 102 with the rocket multi-nozzle grid assembly.

In still another example, directing exhaust gases as previously described with the method 1000 includes guiding the exhaust gases with entrained ablated fragments of the insulator grid 116 into one or more of the plurality of nozzles 118 with a tapered insulator inlet surface 408. The tapered insulator inlet surface 408 guides the ablated fragments over one of more of the plurality of nozzle fittings 114. In another example, cooling the plurality of nozzle fittings 114 includes the ablated fragments absorbing latent hear from the exhaust gases and the ablated fragments changing states within the plurality of nozzles, for instance from solid to liquid and from liquid to solid states.

Method 1000 further includes cooling a grid support plate 112. In one example the plurality of nozzle fittings 114 are seated within the grid support plate 112. For instance, the plurality of nozzle fittings 114 are seated within fitting cavities 300 of the grid support plate 112 as shown in FIG. 3. In yet another example, the method 1000 further includes bracing the plurality of nozzle fittings 114 and the ablative insulator grid 116 with the grid support plate 112.

CONCLUSION

The rocket multi-nozzle grid assembly provides a plurality of nozzles including refractory nozzle fittings configured to withstand high temperatures and accelerate exhaust gases to supersonic velocity. The nozzle fittings are provided within a grid support plate having robust structural integrity to support the nozzle fittings and withstand the high pressures generated within a combustion chamber. Further, the grid assembly includes an insulator grid coupled over the plurality of nozzle fittings and the grid support plate to insulate the grid support plate from the high temperatures within the combustion chamber (in cooperation with the refractory nozzle fittings).

The components of the rocket multi-nozzle grid including the insulator grid, the refractory nozzle fittings and the grid support plate provide a plurality of nozzles with convergent inlets and divergent outlets comprising portions of each of the components. The supersonic flow of exhaust gases with a corresponding thrust profile is provided through the convergent and divergent tapered contour of the plurality of nozzles. The supersonic flow and thrust are provided through a multi-nozzle grid assembly having substantially minimized length and weight compared to an equivalent single nozzle. Further, by using a plurality of nozzles within a grid the propellant is screened throughout operation of a rocket motor, and the grid retains substantially all of the propellant (including uncombusted and loose propellant) therein. Screening and retention of the propellant optimizes combustion, optimizes the corresponding pressure within the combustion chamber and further, optimizes the thrust generated through the multi-nozzle grid assembly. The optimized consumption of propellant offsets the performance losses between an equivalent single nozzle and the multiple nozzles used in the grid assembly.

Further, the rocket multi-nozzle grid assembly maintains the combustion chamber pressure and corresponding thrust within desired performance profiles. The ablative insulator grid substantially maintains the surface area of the grid with only minimal erosion around the nozzles during operation of a rocket motor. In effect, the grid loses thickness, but only minimally changes its surface area. The ablated insulator grid fragments sacrificially protect the nozzle fittings and the grid support plate. The multi-nozzle grid assembly thereby maintains nearly the same shape throughout operation of the rocket motor. Accordingly, specified pressure and thrust profiles are maintained throughout combustion of the propellant by throttling exhaust gases through substantially the same nozzle diameter and contour.

Further still, the ablated insulator grid cools the other components of the grid including the refractory nozzles and the grid support plate. The ablated fragments physically remove heat from the multi-nozzle grid assembly by separating from the assembly. Moreover, the ablated fragments cool the nozzle fittings and the grid support plate by absorbing latent heat from the exhaust gases through phase changes (e.g., from solid to liquid and liquid to gas states). The heat absorbed by the ablated fragments is removed from the nozzle fittings and the grid support plate and ensures the plate and fittings substantially maintain their tapered contour and diameter. Moreover, the tapered configuration of the insulator grid orifices (and the nozzle fitting orifices) is configured to direct the ablated fragments entrained within exhaust gases into the nozzles and ensures the ablated fragments cool the nozzle fittings and the grid support plate.

In the foregoing description, the subject matter has been described with reference to specific exemplary examples. However, it will be appreciated that various modifications and changes may be made without departing from the scope of the present subject matter as set forth herein. The description and figures are to be regarded in an illustrative manner, rather than a restrictive one and all such modifications are intended to be included within the scope of the present subject matter. Accordingly, the scope of the subject matter should be determined by the generic examples described herein and their legal equivalents rather than by merely the specific examples described above. For example, the steps recited in any method or process example may be executed in any order and are not limited to the explicit order presented in the specific examples. Additionally, the components and/or elements recited in any apparatus example may be assembled or otherwise operationally configured in a variety of permutations to produce substantially the same result as the present subject matter and are accordingly not limited to the specific configuration recited in the specific examples.

Benefits, other advantages and solutions to problems have been described above with regard to particular examples; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present subject matter, in addition to those not specifically recited, may be varied or otherwise particularly adapted to specific environments, manufacturing specifications, design parameters or other operating requirements without departing from the general principles of the same.

The present subject matter has been described above with reference to examples. However, changes and modifications may be made to the examples without departing from the scope of the present subject matter. These and other changes or modifications are intended to be included within the scope of the present subject matter, as expressed in the following claims.

It is to be understood that the above description is intended to be illustrative, and not restrictive. Many other examples will be apparent to those of skill in the art upon reading and understanding the above description. It should be noted that examples discussed in different portions of the description or referred to in different drawings can be combined to form additional examples of the present application. The scope of the subject matter should, therefore, be determined with reference to the appended claims, along with the full scope of equivalents to which such claims are entitled.

What is claimed is:
1. A rocket multi-nozzle grid assembly comprising:
an insulator grid, the insulator grid includes a plurality of insulator orifices;
a plurality of refractory nozzle fittings coupled along the insulator grid, each of the plurality of refractory nozzle fittings includes a fitting orifice;

a grid support plate directly connecting to the plurality of refractory nozzle fittings and the insulator grid, the plurality of refractory nozzle fittings are interposed between the insulator grid and the grid support plate, and the grid support plate includes a plurality of plate orifices; and a plurality of nozzles, each of the plurality of nozzles includes one plate orifice of the plurality of plate orifices aligned with one insulator orifice of the plurality of insulator orifices and one fitting orifice of a refractory nozzle fitting of the plurality of refractory nozzle fittings, and each of the plurality of nozzles includes a tapered inlet surface formed by at least the insulator grid and one refractory nozzle fitting of the plurality of refractory nozzle fittings.

2. The rocket multi-nozzle grid assembly of claim 1, wherein one or more of the plurality of refractory nozzle fittings are each seated within separate fitting cavities in the grid support plate.

3. The rocket multi-nozzle grid assembly of claim 2, wherein one or more of the fitting cavities include plate flanges and one or more of the nozzle fittings include fitting flanges, and the fitting flanges are seated along the plate flanges.

4. The rocket multi-nozzle grid assembly of claim 1, wherein the insulator grid includes an ablative material configured to sacrificially ablate when impinged with exhaust gases.

5. The rocket multi-nozzle grid assembly of claim 1, wherein the grid support plate has a plate tensile modulus greater than both of a fitting tensile modulus of the nozzle fittings and an insulator tensile modulus of the insulator grid.

6. The rocket multi-nozzle grid assembly of claim 1, wherein the plurality of nozzles includes a convergent nozzle portion having the tapered inlet surface tapering toward a nozzle throat.

7. The rocket multi-nozzle grid assembly of claim 6, wherein the tapered inlet surface is configured to direct ablated fragments of the insulator grid through one or more of the plurality of nozzles.

8. The rocket multi-nozzle grid assembly of claim 6, wherein the tapered inlet surface includes a tapered fitting inlet surface in one or more of the refractory nozzle fittings.

9. The rocket multi-nozzle grid assembly of claim 6, wherein the tapered inlet surface includes one or more tapered insulator inlet surfaces in the insulator grid.

10. The rocket multi-nozzle grid assembly of claim 6, wherein the tapered inlet surface includes a continuous radial taper extending between the insulator grid and one or more of the plurality of refractory nozzle fittings.

11. The rocket multi-nozzle grid assembly of claim 1, wherein one or more of the plurality of nozzles includes a divergent nozzle portion having a tapered outlet surface tapering toward a nozzle throat.

12. The rocket multi-nozzle grid assembly of claim 11, wherein the tapered outlet surface includes a tapered fitting outlet surface in one or more of the refractory nozzle fittings.

13. The rocket multi-nozzle grid assembly of claim 11, wherein the tapered outlet surface includes a continuous taper extending between one or more of the plurality of refractory nozzle fittings and the grid support plate.

14. The rocket multi-nozzle grid assembly of claim 1, wherein a portion of the insulator grid extends over the plurality of refractory nozzle fittings.

15. A rocket motor comprising:
a motor housing including a combustion chamber;
a propellant within the combustion chamber;
a rocket multi-nozzle grid assembly coupled with the motor housing, the rocket multi-nozzle grid assembly includes:
an insulator grid, the insulator grid includes a plurality of insulator orifices;
a plurality of refractory nozzle fittings coupled along the insulator grid, each of the plurality of refractory nozzle fittings includes a fitting orifice;
a grid support plate directly connecting to the plurality of refractory nozzle fittings and the insulator grid, the plurality of refractory nozzle fittings are interposed between the insulator grid and the grid support plate, and the grid support plate includes a plurality of plate orifices; and
a plurality of nozzles in communication with the combustion chamber, each of the plurality of one or more of the nozzles includes one plate orifice of the plurality of plate orifices aligned with one insulator orifice of the plurality of insulator orifices and one fitting orifice of a refractory nozzle fitting of the plurality of refractory nozzle fittings and each of the plurality of nozzles includes a tapered inlet surface formed by at least the insulator grid and one refractory nozzle fitting of the plurality of refractory nozzle fittings.

16. The rocket motor of claim 15, wherein one or more of the plurality of refractory nozzle fittings are each seated within separate fitting cavities in the grid support plate.

17. The rocket motor of claim 15, wherein the insulator grid includes an ablative material configured to sacrificially ablate when impinged with exhaust gases.

18. The rocket motor of claim 15, wherein the grid support plate has a plate tensile modulus greater than both of a fitting tensile modulus of the nozzle fittings and an insulator tensile modulus of the insulator grid.

19. The rocket multi-nozzle grid assembly of claim 15, wherein the plurality of nozzles includes a convergent nozzle portion having the tapered inlet surface tapering toward a nozzle throat.

20. The rocket motor of claim 19, wherein the tapered inlet surface includes a continuous radial taper extending between the insulator grid and one or more of the plurality of refractory nozzle fittings.

21. The rocket motor of claim 15, wherein a portion of the insulator grid extends over the plurality of refractory nozzle fittings.

* * * * *

UNITED STATES PATENT AND TRADEMARK OFFICE
CERTIFICATE OF CORRECTION

PATENT NO. : 8,596,040 B2  
APPLICATION NO. : 13/049024  
DATED : December 3, 2013  
INVENTOR(S) : Chasman et al.

Page 1 of 2

It is certified that error appears in the above-identified patent and that said Letters Patent is hereby corrected as shown below:

In the drawings,

Sheet 9 of 11, Fig. 9B, reference numeral 118, delete "118" and insert --918--, therefor In the specification, In column 1, line 28, delete "however" and insert --however,--, therefor In column 5, line 30, after "the", insert --insulator--, therefor In column 7, line 5, delete "116" and insert --112--, therefor In column 7, line 35, after "118", insert --of--, therefor In column 8, line 64, after "the", insert --multi-nozzle grid--, therefor In column 8, line 67, delete "value;" and insert --value,--, therefor In column 8, line 67, after "the", insert --multi-nozzle--, therefor In column 9, line 10, delete "nozzle" and insert --nozzles--, therefor In column 9, line 37, delete "nozzles" and insert --nozzles,--, therefor In column 9, line 41, delete "grid" and insert --multi-nozzle grid assembly--, therefor In column 10, line 44, delete "412" and insert --404--, therefor In column 11, line 8, delete "118" and insert --114--, therefor Signed and Sealed this  
Thirty-first Day of May, 2016

Michelle K. Lee  
*Director of the United States Patent and Trademark Office*

CERTIFICATE OF CORRECTION (continued)
U.S. Pat. No. 8,596,040 B2

In the specification,

In column 12, line 21, delete "nozzles" and insert --nozzle--, therefor

In column 12, line 65, delete "402" and insert --412--, therefor

In column 13, line 1, delete "404," and insert --414,--, therefor

In column 16, line 15, delete "thicker" and insert --insulator--, therefor

In column 18, line 24, delete "FIG." and insert --FIGS.--, therefor

In column 18, line 39, delete "example" and insert --example,--, therefor

In column 20, line 4, delete "assembly," and insert --assembly--, therefor